(12) United States Patent
Sarlioglu et al.

(10) Patent No.: US 10,539,147 B2
(45) Date of Patent: Jan. 21, 2020

(54) INTEGRATED ROTOR FOR AN ELECTRICAL MACHINE AND COMPRESSOR

(71) Applicant: Wisconsin Alumni Research Foundation, Madison, WI (US)

(72) Inventors: Bulent Sarlioglu, Madison, WI (US); Yingjie Li, Madison, WI (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 641 days.

(21) Appl. No.: 14/994,313

(22) Filed: Jan. 13, 2016

(65) Prior Publication Data

US 2017/0198701 A1  Jul. 13, 2017

(51) Int. Cl.
*F04D 25/06* (2006.01)
*F04D 29/32* (2006.01)
(Continued)

(52) U.S. Cl.
CPC ........... *F04D 29/324* (2013.01); *F04D 19/00* (2013.01); *F04D 19/02* (2013.01);
(Continued)

(58) Field of Classification Search
CPC .... F04D 25/0606; F04D 25/06; F04D 25/064; F04D 25/0646; F04D 19/02;
(Continued)

(56) References Cited

U.S. PATENT DOCUMENTS 2,749,027 A * 6/1956 Stalker ................. F04D 19/028
                                                    415/144
5,222,863 A * 6/1993 Jones ....................... B63H 5/10
                                                    415/194
(Continued)

FOREIGN PATENT DOCUMENTS

CN    101442246 A  *  5/2009  ............... H02K 1/14
JP    H0164964      *  4/1989  ............. H02K 16/00
(Continued)

OTHER PUBLICATIONS

Deformation and Noise Mitigation for the Linear Switched Reluctance Motor With Skewed Teeth Structure, by Zou, published 2014.*
(Continued)

*Primary Examiner* — Charles G Freay
*Assistant Examiner* — Thomas Fink
(74) *Attorney, Agent, or Firm* — Bell & Manning, LLC

(57) ABSTRACT

An electric machine includes a rotor, a stator, and a winding. The rotor includes a rotor core and blades extending from the rotor core. Each blade is curved in an axial direction along the rotor core and is simultaneously configured as a pole that carries a magnetic flux of the electrical machine and as an airfoil that compresses a gas when the rotor is rotated. The gas flows axially between successive blades of the blades. The stator includes a stator core and teeth extending from the stator core toward the blades. Slots are defined between successive teeth. The winding is wound through at least two slots. The stator is mounted radially (Continued)

relative to the rotor so that a gap separates the blades from an exterior face of the teeth that is axially aligned along the stator core to follow an axial edge of a blade of the blades.

20 Claims, 18 Drawing Sheets

(51) Int. Cl.
    *H02K 16/00*     (2006.01)
    *F04D 19/02*     (2006.01)
    *H02K 7/14*     (2006.01)
    *F04D 19/00*     (2006.01)
    *H02K 7/18*     (2006.01)
    *H02K 1/24*     (2006.01)
    *H02K 21/44*     (2006.01)

(52) U.S. Cl.
    CPC ......... *F04D 25/0606* (2013.01); *H02K 1/246* (2013.01); *H02K 7/14* (2013.01); *H02K 7/1823* (2013.01); *H02K 16/00* (2013.01); *H02K 21/44* (2013.01); *H02K 2201/06* (2013.01)

(58) Field of Classification Search
    CPC ........ F04D 19/007; H02K 21/44; H02K 1/17; H02K 1/165; H02K 1/06; H02K 1/246
    USPC .................................................. 417/355–356
    See application file for complete search history.

(56) References Cited

U.S. PATENT DOCUMENTS

| | | | | |
|---|---|---|---|---|
| 5,266,859 | A * | 11/1993 | Stanley | H02K 1/146 310/216.012 |
| 5,562,405 | A * | 10/1996 | Ryall | F04D 19/028 415/199.3 |
| 5,755,554 | A * | 5/1998 | Ryall | F04D 3/00 415/199.4 |
| 6,547,514 | B2 * | 4/2003 | Lee | E21B 43/128 415/1 |
| 7,021,905 | B2 | 4/2006 | Torrey et al. | |
| 8,790,236 | B2 | 7/2014 | LaRose et al. | |
| 2003/0057800 | A1 * | 3/2003 | Gizaw | F04D 25/0606 310/261.1 |
| 2003/0122438 | A1 * | 7/2003 | Winkel | F04D 29/263 310/112 |
| 2003/0122540 | A1 * | 7/2003 | Fite | F16C 19/52 324/175 |
| 2004/0215050 | A1 * | 10/2004 | Morello | A61M 1/1086 600/17 |
| 2009/0091198 | A1 * | 4/2009 | Husband | H02K 21/44 310/46 |
| 2009/0246013 | A1 * | 10/2009 | Kenyon | A61M 16/0057 415/208.2 |
| 2010/0117475 | A1 | 5/2010 | Leonardi et al. | |
| 2013/0113318 | A1 * | 5/2013 | Nishiyama | H02K 21/44 310/114 |
| 2013/0175891 | A1 * | 7/2013 | Kim | H02K 7/14 310/48 |
| 2015/0345501 | A1 * | 12/2015 | Uskert | H02K 16/00 417/420 |
| 2016/0230768 | A1 * | 8/2016 | Bambrogan | F04D 25/0666 |
| 2016/0290345 | A1 * | 10/2016 | Palomba | F04D 17/12 |
| 2017/0002830 | A1 * | 1/2017 | Bothma | A61M 16/0066 |
| 2017/0159665 | A1 * | 6/2017 | Bergamini | F04D 17/122 |
| 2017/0227012 | A1 * | 8/2017 | Hirata | F04D 1/08 |
| 2018/0087513 | A1 * | 3/2018 | Hoffman | F04D 19/007 |
| 2018/0180057 | A1 * | 6/2018 | Krishnan | F04D 29/102 |

FOREIGN PATENT DOCUMENTS

| | | | | |
|---|---|---|---|---|
| JP | H11230088 | A * | 8/1999 | ............. F04D 25/08 |
| JP | 2002153027 | A * | 5/2002 | ............... H02K 1/27 |
| JP | 2008289335 | A * | 11/2008 | ............. H02K 16/00 |

OTHER PUBLICATIONS

N. Rotevatn, Design and testing of Flux Switched Permanent Magnet (FSPM) Machines, Master of Science in Energy and Environment, Norwegian University of Science and Technology, Department of Electrical Power Engineering, Jun. 2009.

Wang et al., Reduction of Cogging Torque in Permanent Magnet Flux-Switching Machines, J. Electromagnetic Analysis & Applications 1, Mar. 2009, pp. 11-14.

Yang et al., Acoustic Noise/Vibration Reduction of a Single-Phase SRM Using Skewed Stator and Rotor, IEEE Transactions on Industrial Electronics, vol. 60, No. 10, Sep. 6, 2012, pp. 4292-4300.

* cited by examiner

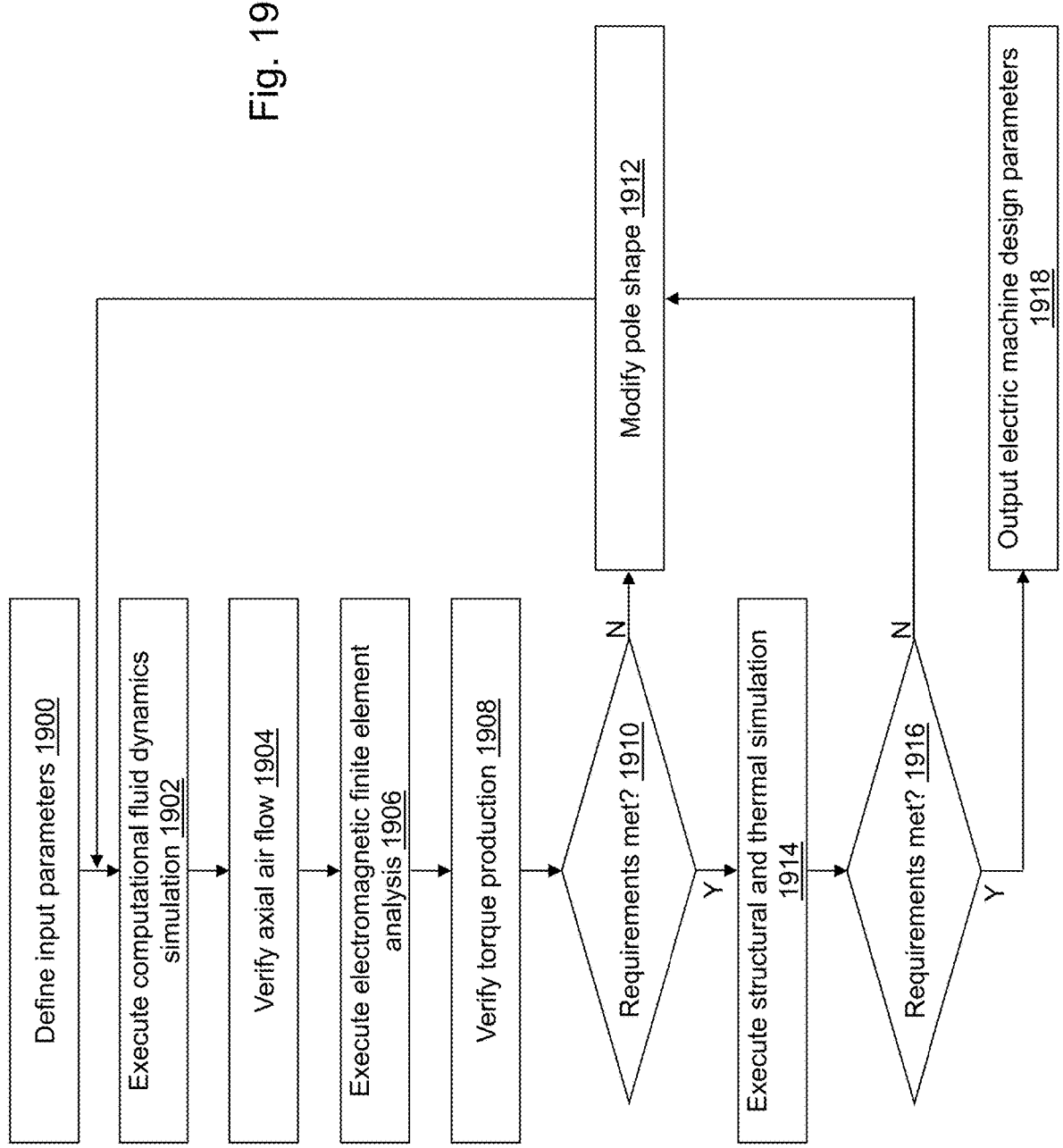

INTEGRATED ROTOR FOR AN ELECTRICAL MACHINE AND COMPRESSOR

BACKGROUND

A gas compressor increases a pressure of a gas by reducing its volume. An air compressor is a specific type of gas compressor designed to compress air. Though a gas compressor and a fluid pump both increase the pressure on the gas/fluid and transport the gas/fluid through a conduit, a gas compressor also reduces the volume of the gas. Liquids are relatively incompressible. As a result, the main action of a pump is to pressurize and transport liquids and not to compress them. Gas compression is used in heating, ventilating, and air conditioning (HVAC) systems in buildings, cars, and airplanes, in vehicle propulsion, in energy storage, in air brakes in railway and road vehicles, in scuba diving equipment, in refrigeration systems, in air start systems for aircraft engines, etc. Gas compressors place significant demands on utility generators and power distributors.

SUMMARY

In an example embodiment, an electric machine includes, but is not limited to, a rotor, a stator, and a winding. The rotor includes, but is not limited to, a rotor core and a plurality of blades extending from the rotor core. The rotor core is configured to mount to a shaft for rotation of the rotor core and shaft together. Each blade of the plurality of blades is curved in an axial direction along the rotor core and is simultaneously configured as a pole that carries a magnetic flux of the electrical machine and as an airfoil that compresses a gas when the rotor is rotated. The gas flows axially between successive blades of the plurality of blades.

The stator includes, but is not limited to, a stator core and a plurality of teeth extending from the stator core toward the plurality of blades. The plurality of teeth define a plurality of slots between successive teeth of the plurality of teeth. The winding is wound through at least two slots of the plurality of slots. The stator is mounted radially relative to the rotor so that a gap separates the plurality of blades from an exterior face of the plurality of teeth. The exterior face of the plurality of teeth is axially aligned along the stator core to follow an axial edge of a blade of the plurality of blades.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 19 depicts a flow diagram illustrating examples of operations performed to determine parameters for the electric machines of FIGS. 1 and 10-13 in accordance with an illustrative embodiment.

DETAILED DESCRIPTION

Figure 1:
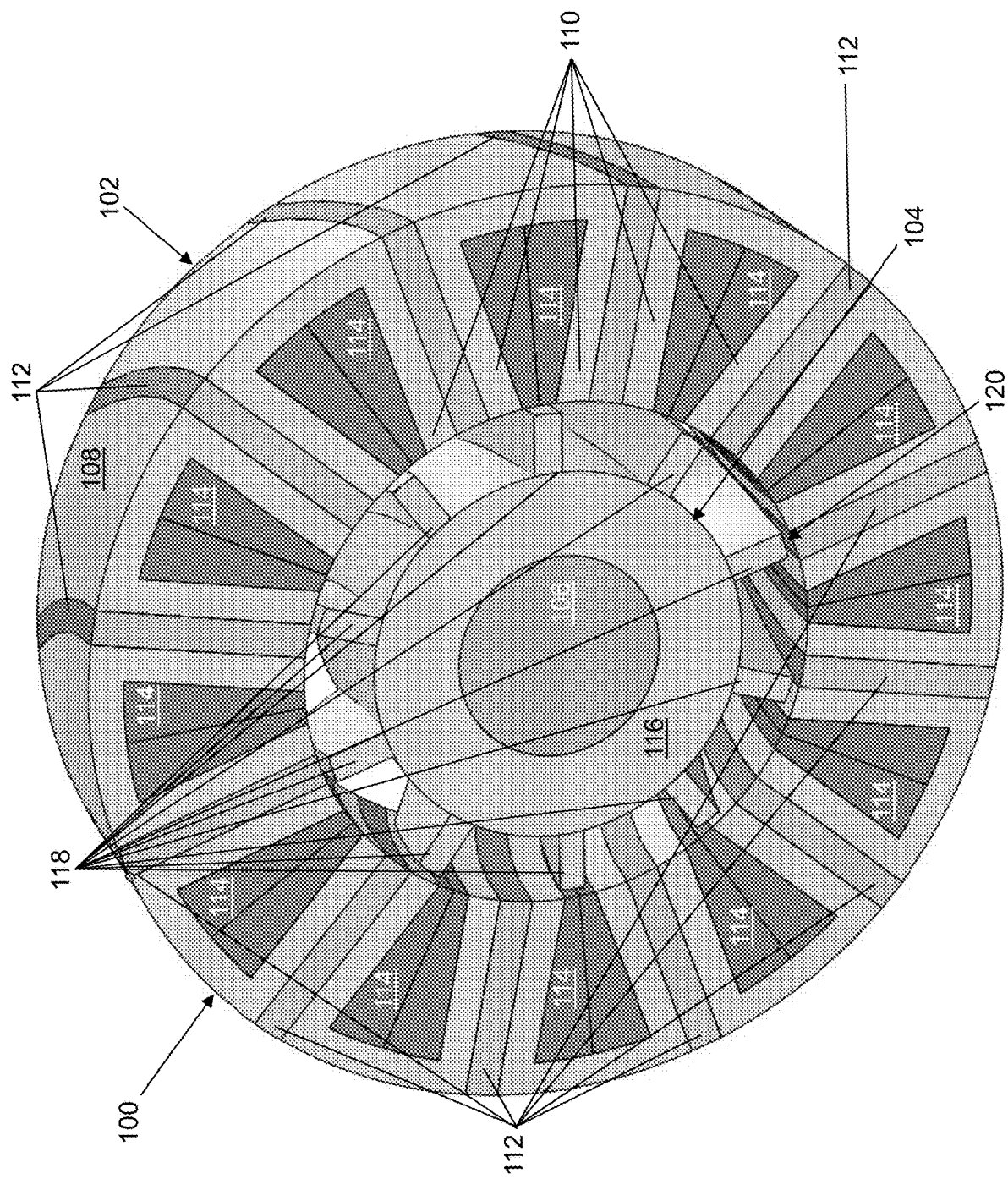
FIG. 1 depicts a perspective view of an electric machine in accordance with an illustrative embodiment.

Referring to FIG. 1, a perspective view of an electric machine 100 is shown in accordance with an illustrative embodiment. In the illustrative embodiment of FIG. 1, electric machine 100 is a radial flux switching permanent magnet machine (FSPM). Electric machine 100 may include a stator 102, a rotor 104, and a plurality of windings 114. In the illustrative embodiment, electric machine 100 is a three-phase machine that can be configured as a generator or as a motor as understood by a person of skill in the art. In alternative embodiments, electric machine 100 can be configured to support a fewer or a greater number of phases.

Use of directional terms, such as top, bottom, right, left, front, back, upper, lower, horizontal, vertical, behind, etc. are merely intended to facilitate reference to the various surfaces of the described structures relative to the orientations shown in the drawings and are not intended to be limiting in any manner unless otherwise indicated.

Electric machine 100 may be used in various orientations. A shaft 106 may be mounted to extend parallel to a z-axis (shown referring to FIGS. 3 and 5) that is perpendicular to an x-axis and a y-axis (shown referring to FIGS. 2, 3, and 5). The x-axis and the y-axis are perpendicular to each other so that the x-axis, y-axis, and z-axis form an orthonormal coordinate system. The z-axis defines an axial direction that extends through a center of rotor 104. In the illustrative embodiment of FIG. 1, rotor 104 is mounted radially within stator 102, and rotor 104 is mounted to shaft 106 for rotation. Rotor 104 is separated from stator 102 by an air gap 120. In an alternative embodiment, stator 102 may be mounted radially within rotor 104, and shaft 106 may or may not extend through a center of electric machine 100.

As used in this disclosure, the term "mount" includes join, unite, connect, couple, associate, insert, hang, hold, affix, attach, fasten, bind, paste, secure, bolt, screw, rivet, pin, nail, clasp, clamp, cement, fuse, solder, weld, glue, form over, slide together, layer, and other like terms. The phrases "mounted on" and "mounted to" include any interior or exterior portion of the element referenced. These phrases also encompass direct mounting (in which the referenced elements are in direct contact) and indirect mounting (in which the referenced elements are not in direct contact, but are mounted together via intermediate elements). Elements referenced as mounted to each other herein may further be integrally formed together, for example, using a molding process as understood by a person of skill in the art. As a result, elements described herein as being mounted to each other need not be discrete structural elements. The elements may be mounted permanently, removably, or releasably.

Stator 102 may include a stator core 108, a plurality of teeth 110, and a plurality of magnets 112 that form a plurality of stator poles. Stator 102 has a generally circular cross section with a hollow core sized to accommodate shaft 106 and rotor 104. Stator core 108 and the plurality of teeth 110 may be formed of a ferromagnetic material such as lamination steel, iron, cobalt, nickel, etc. Stator core 108 and the plurality of teeth 110 may be formed of laminations stacked in the axial direction. The laminations may be punched or laser cut. In the illustrative embodiment, the number of stator slots or stator poles of stator 102 is $p_s=12$ though stator 102 may include a fewer or a greater number of stator poles.

Rotor 104 has a generally circular cross section with a hollow core sized to accommodate shaft 106. Rotor 104 may include a rotor core 116 and a plurality of blades 118 that form a plurality of rotor poles. The number of rotor poles may depend on the number of phases supported by electric machine 100. In the illustrative embodiment, the number of rotor blades or rotor poles of rotor 104 is $p_r=10$ though rotor 104 may include a fewer or a greater number of rotor poles. Rotor core 116 and the plurality of blades 118 may be formed of a ferromagnetic material such as lamination steel, iron, cobalt, nickel, etc. Rotor core 116 and the plurality of blades 118 may be formed of laminations stacked in the axial direction that is parallel to the z-axis. The laminations may be punched or laser cut.

Rotor 104 may control rotation of shaft 106 when electric machine 100 is acting as a motor, and shaft 106 may control rotation of rotor 104 when electric machine 100 is acting as a generator. Electric machine 100 may be configured to act as both a generator and a motor or as a generator or as a motor.

The excitation frequency, $f_e$, of an FSPM machine is proportional to the number of rotor poles ($p_r$) as $$f_e = \frac{np_r}{60},$$

where n is a rotational speed, for example, in revolutions per minute (RPM). A typical FSPM machine has $p_s=12$ and $p_r=10$ though a minimum number of stator slots is six for a three-phase machine because the number of stator slots is an even number and a multiple of the number of phases. The number of rotor poles can be 4, 5, 7, 8, etc. though not all of these combinations may be suitable for practical use.

Figure 2:
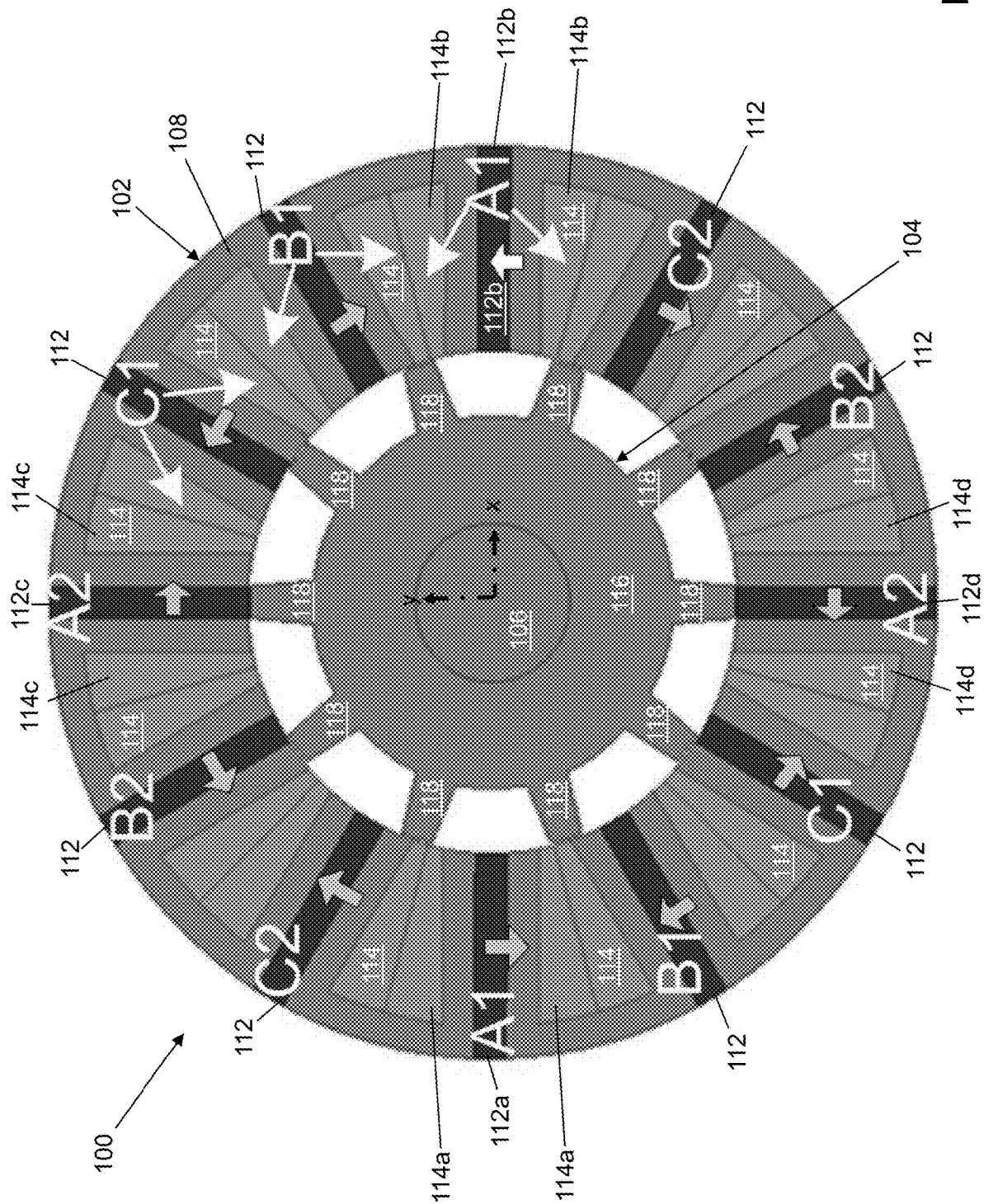
FIG. 2 depicts a front view of the electric machine of FIG. 1 in accordance with an illustrative embodiment.

Referring to FIG. 2, a front view of electric machine 100 is shown in accordance with an illustrative embodiment. Stator core 108 and the plurality of teeth 110 form a plurality of slots in which the plurality of windings 114 are wound. A winding of the plurality of windings 114 is wound over at least one magnet of the plurality of magnets 112 and through at least two slots of the plurality of slots. For example, in the illustrative embodiment of FIG. 2, a first winding 114a is wound over a first magnet 112a and defines a first phase "A" winding. A second winding 114b is wound over a second magnet 112b and defines a second phase "A" winding. A third winding 114c is wound over a third magnet 112c and defines a third phase "A" winding. A fourth winding 114d is wound over a fourth magnet 112d and defines a fourth phase "A" winding. First winding 114a and second winding 114b may be connected in series. Third winding 114c and fourth winding 114d may be connected in series. First winding 114a, second winding 114b, third winding 114c, and fourth winding 114d may be connected in series in various orders. Similarly, the remaining windings are wound over the remaining magnets to form four phase "B" windings and four phase "C" windings. Each of the plurality of windings 114 may form a concentrated coil. Each winding of the plurality of windings 114 conducts a current in a positive or a negative direction.

The plurality of magnets 112 are permanent magnets formed of non-rare or rare earth elements such as ferrite, samarium-cobalt, neodymium-iron-boron, etc. The plurality of magnets 112 may be cast, sintered, molded, etc. Each magnet of the plurality of magnets 112 is magnetized to form a south (S) pole on a first side and a north (N) pole on a second side opposite the first side, wherein the magnetization direction is in a circumferential direction from the first side to the second side of the magnet relative to the generally circular cross section of stator 102. The plurality of magnets 112 are mounted with N poles adjacent N poles and S poles adjacent S poles to form pole pairs. The pole pairs are formed at a regular pitch circumferentially around stator 102. In the illustrative embodiment, the block arrows point from the north polarity to the south polarity.

Figure 3:
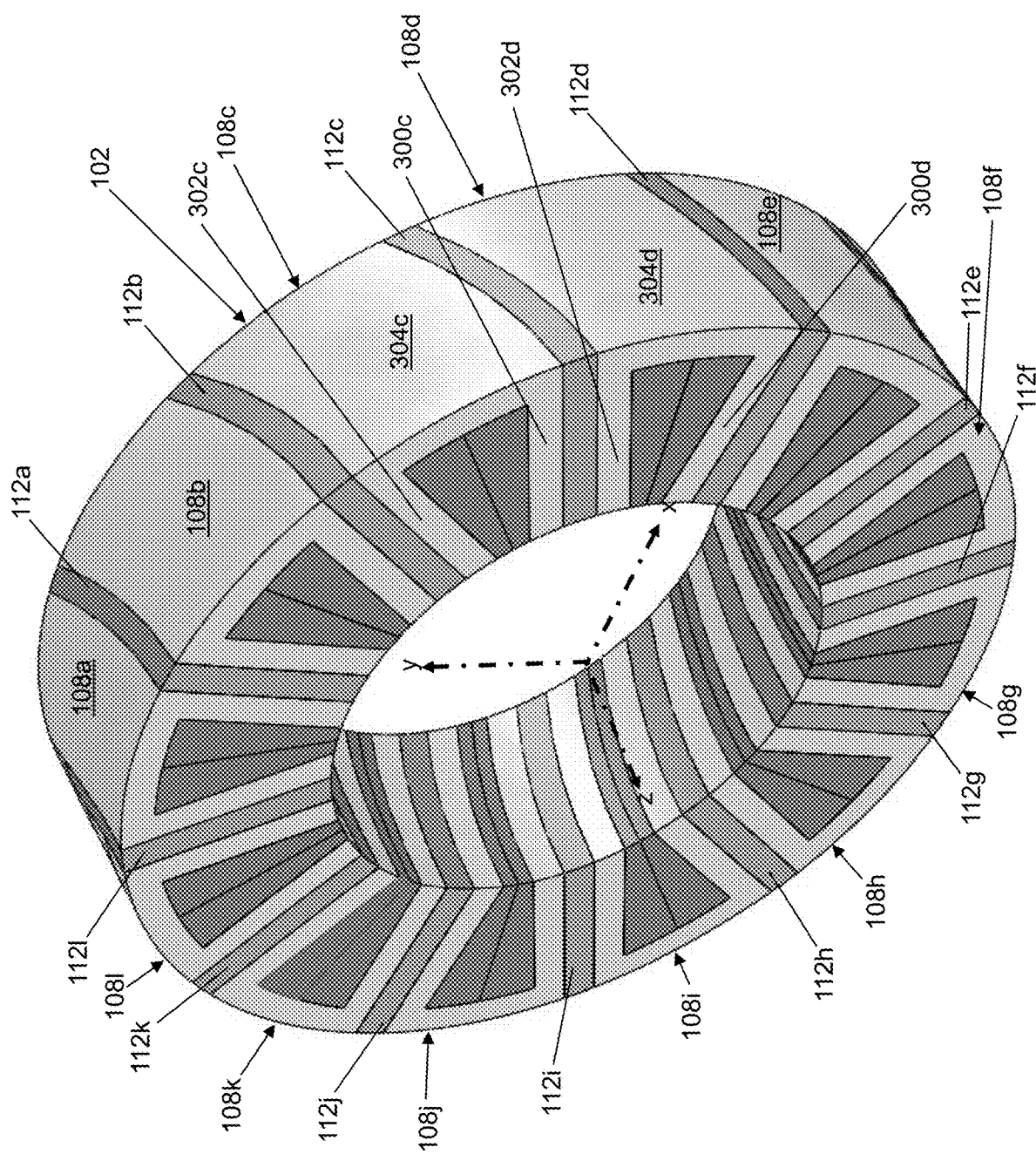
FIG. 3 depicts a perspective view of a stator of the electric machine of FIG. 1 in accordance with an illustrative embodiment.

Referring to FIG. 3, a perspective view of stator 102 of electric machine 100 is shown in accordance with an illustrative embodiment. Stator 102 has a hollow cylindrical shape with an aperture through a center of the cylinder. Stator core 108 and the plurality of teeth 110 may form a plurality of core pieces. In the illustrative three-phase embodiment, the plurality of core pieces include four core pieces for each phase such that the plurality of core pieces includes a first core piece 108a, a second core piece 108b, a third core piece 108c, a fourth core piece 108d, a fifth core piece 108e, a sixth core piece 108f, a seventh core piece 108g, an eighth core piece 108h, a ninth core piece 108i, a tenth core piece 108j, an eleventh core piece 108k, and a twelfth core piece 108l. In the illustrative embodiment, each core piece of the plurality of core pieces has the same size and shape. In the illustrative embodiment, each core piece has a "C"-shape distributed circumferentially at a regular pitch around the z-axis and open towards rotor 104. For example, third core piece 108c has a first tooth 300c, a second tooth 302c, and a core section 304c, and fourth core piece 108d has a first tooth 300d, a second tooth 302d, and a core section 304d. First tooth 300c and second tooth 302c extend from core section 304c to form a C-shaped face that opens towards the z-axis and rotor 104. First tooth 300d and second tooth 302d extend from core section 304d to form a C-shaped face that opens towards the z-axis and rotor 104. The hollow of the C-shape of each core piece defines a stator slot within which the plurality of windings 114 is wound. The slots are distributed at equal angles around a circumference of stator 102.

In the illustrative embodiment of FIG. 3, the plurality of magnets 112 are mounted between the teeth of adjacent core pieces. For example, a third magnet 112c fits in a slot formed between a first tooth 300c of third core piece 108c and second tooth 302d of fourth core piece 108d. The remaining magnets are similarly mounted and distributed circumferentially around stator core 108. For example, a first magnet 112a fits in a slot formed between first core piece 108a and second core piece 108b; a second magnet 112b fits in a slot formed between second core piece 108b and third core piece 108c; a fourth magnet 112d fits in a slot formed between fourth core piece 108d and fifth core piece 108e; a fifth magnet 112e fits in a slot formed between fifth core piece 108e and sixth core piece 108f; a sixth magnet 112f fits in a slot formed between sixth core piece 108f and seventh core piece 108g; a seventh magnet 112g fits in a slot formed between seventh core piece 108g and eighth core piece 108h; an eighth magnet 112h fits in a slot formed between eighth core piece 108h and ninth core piece 108i; a ninth magnet 112i fits in a slot formed between ninth core piece 108i and tenth core piece 108j; a tenth magnet 112j fits in a slot formed between tenth core piece 108j and eleventh core piece 108k; an eleventh magnet 112k fits in a slot formed between eleventh core piece 108k and twelfth core piece 108l; and a twelfth magnet 112l fits in a slot formed between twelfth core piece 108l and first core piece 108a.

In the illustrative embodiment, each magnet of the plurality of magnets 112 has the same size and shape. For example, each magnet of the plurality of magnets 112 has a rectangular shape in the x-y-plane though each magnet of the plurality of magnets 112 may have a truncated wedge shape or other polygonal and/or elliptical shape in the x-y-plane in alternative embodiments. The plurality of core pieces and the plurality of magnets 112 form the circular cross section of stator 102 in the x-y-plane with the z-axis extending axially through a center of the circular cross section of stator 102.

Each magnet of the plurality of magnets 112 is curved in the x-y-plane in the direction of the z-axis to axially align the plurality of magnets 112 with an axially extending edge or face of a blade of the plurality of blades 118. Being curved in the x-y-plane in the direction of the z-axis means that a location of each magnet of the plurality of magnets 112, such as third magnet 112c, is at a different (x,y) coordinate value at each location along the z-axis. The (x,y) coordinate variation follows a continuous curve with a non-zero curvature value (not a straight line) between a front face of stator 102 and a back face of stator 102. The continuous curve may be monotonic.

A stator pole width may or may not have the same value in the axial direction, i.e. the width may change, for example, as a trade-off between manufacturability and torque production. Each magnet of the plurality of magnets 112 and each core piece may be segmented in the axial direction such that the segmentation follows the curvature line.

Figure 4:
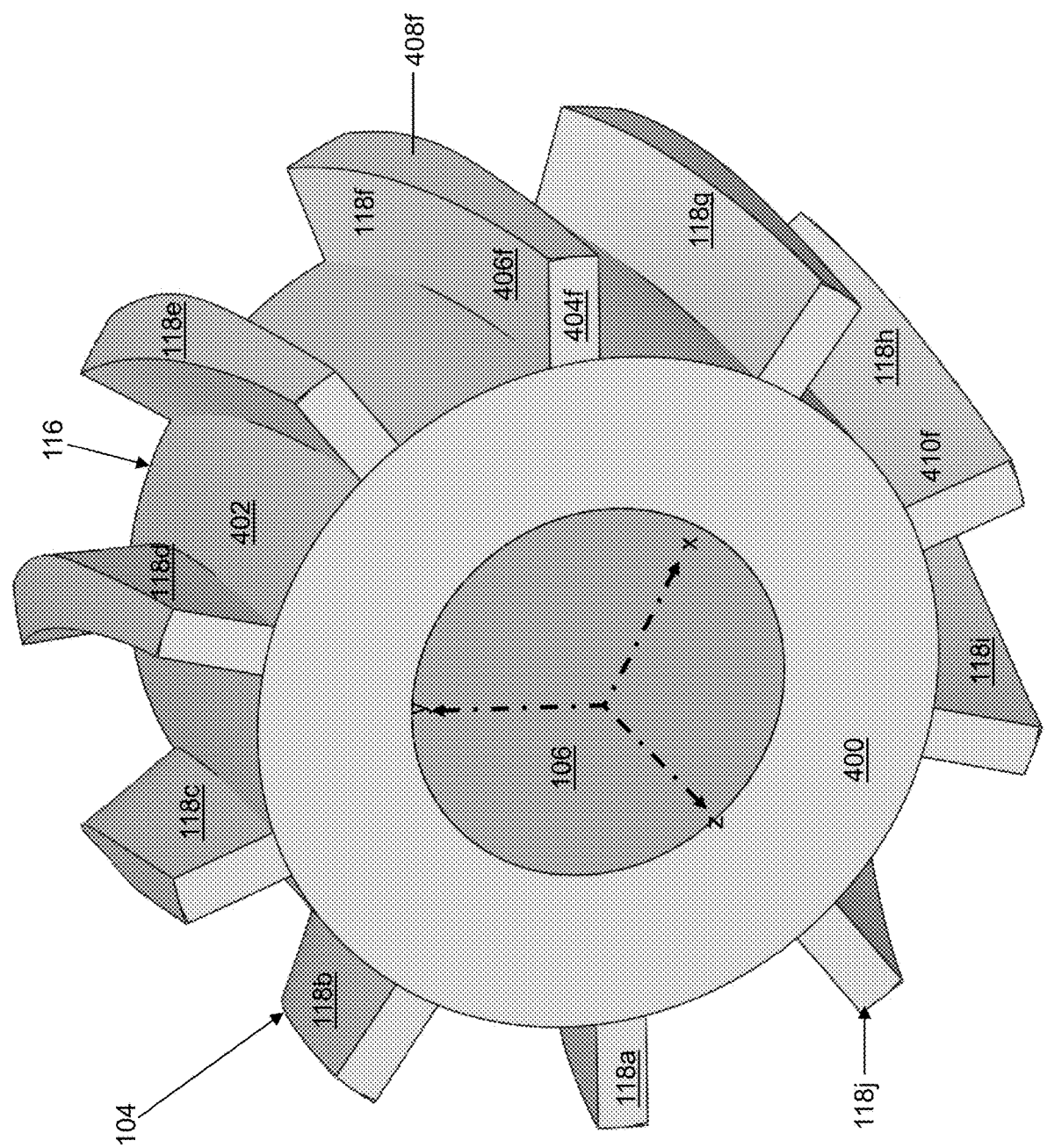
FIG. 4 depicts a perspective view of a first rotor of the electric machine of FIG. 1 in accordance with an illustrative embodiment.

Referring to FIG. 4, a perspective view of rotor 104 is shown in accordance with an illustrative embodiment. Rotor core 116 has a hollow cylindrical shape with an aperture through a center of the cylinder. Rotor core 116 may include a rotor front face 400, a rotor back face (not shown), a rotor interior face 1008 (shown with reference to FIG. 10), and a rotor exterior face 402. Rotor exterior face 402 and rotor interior face 1008 extend between rotor front face 400 and the rotor back face. Rotor front face 400 and the rotor back face are in the x-y-plane. Rotor interior face 1008 and rotor exterior face 402 extend parallel to the z-axis or in the axial direction. Shaft 106 mounts to rotor interior face 1008. The plurality of blades 118 extend from rotor exterior face 402. Of course, if stator 102 is mounted interior of rotor 104 instead of exterior as in the illustrative embodiment, the plurality of blades 118 would extend from rotor interior face 1008. The plurality of blades 118 extend from rotor exterior face 402 at a regular pitch circumferentially around rotor core 116.

The plurality of blades 118 includes a first blade 118a, a second blade 118b, a third blade 118c, a fourth blade 118d, a fifth blade 118e, a sixth blade 118f, a seventh blade 118g, an eighth blade 118h, a ninth blade 118i, and a tenth blade 118j that each has the same size and shape. In alternative embodiments, the plurality of blades 118 may have a different size or shape. For example, sixth blade 118f includes a front face 404f, a back face (not shown), a first side face 406f, a second side face (not shown), and an exterior face 408f. First side face 406f, the second side face, and exterior face 408f extend between front face 404f and the back face. Front face 404f extends from rotor exterior face 402, and the back face extends from the rotor back face. First side face 406f and the second side face extend from rotor exterior face 402. Exterior face 408f extends between first side face 406f and the second side face and defines an axial edge of sixth blade 118f. In the illustrative embodiment of FIG. 4, a rotor pole width of exterior face 408f changes in an axial direction with a curvature.

Air gap 120 is defined between exterior face 408f of sixth blade 118f and inner edges of each tooth of stator 102. Air gap 120 is similarly defined between an exterior face 408 of each of first blade 118a, second blade 118b, third blade 118c, fourth blade 118d, fifth blade 118e, seventh blade 118g, eighth blade 118h, ninth blade 118i, and tenth blade 118j and the inner edges of each tooth of stator 102.

Each blade of the plurality of blades 118 is shaped, sized, and/or positioned to carry a magnetic flux of electric machine 100. Each blade of the plurality of blades 118 is simultaneously shaped, sized, and/or positioned to act as an airfoil that compresses a gas when rotor 104 is rotated. Rotor 104 may be used as part of a gas compressor stage. The gas flows axially between successive blades of the plurality of blades 118.

Figure 5:
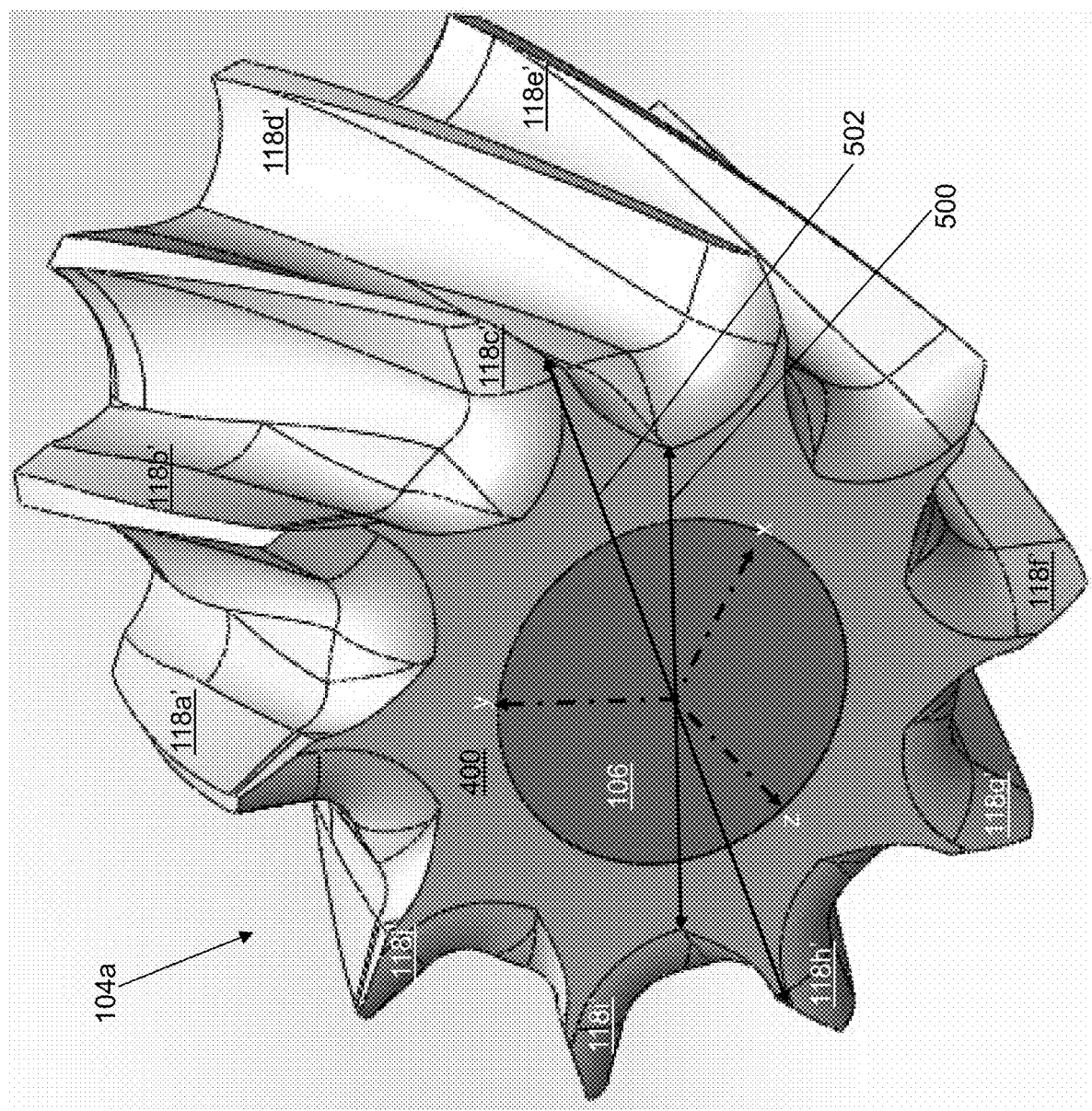
FIG. 5 depicts a perspective view of a second rotor of the electric machine of FIG. 1 in accordance with an illustrative embodiment.

Referring to FIG. 5, a perspective view of a second rotor 104a of electric machine 100 is shown in accordance with an illustrative embodiment. Rotor core 116 has a hollow cylindrical shape with an aperture through a center of the cylinder. Rotor core 116 may include a rotor front face 400, a rotor back face (not shown), and rotor interior face 1008. The plurality of blades 118 include a first airfoil blade 118a', a second airfoil blade 118b', a third airfoil blade 118c', a fourth airfoil blade 118d', a fifth airfoil blade 118e', a sixth airfoil blade 118f, a seventh airfoil blade 118g', an eighth airfoil blade 118h', a ninth airfoil blade 118i', and a tenth airfoil blade 118j' that each has the same size and shape. First airfoil blade 118a', second airfoil blade 118b', third airfoil blade 118c', fourth airfoil blade 118d', fifth airfoil blade 118e', sixth airfoil blade 118f', seventh airfoil blade 118g', eighth airfoil blade 118h', ninth airfoil blade 118i', and tenth airfoil blade 118F form fan-like airfoils to progressively compress the gas that flows between successive blades of the plurality of blades 118.

The plurality of blades 118 are designed such that there is simultaneous energy conversion in both the electromagnetic domain and the fluid dynamic domain. The electromagnetic part of the blade design creates efficient energy conversion between electric energy supplied/generated by currents applied to the plurality of windings 114 and mechanical energy generated/supplied by rotating shaft 106. The fluid dynamic design converts the kinetic energy from rotation of rotor 104 directly into a pressure rise in the gas that flows between successive blades of the plurality of blades 118. The synergized design approach uses electric machine sizing equations and fluid dynamic equations to determine the power converted in each domain. The output power from electric energy is calculated based on the electric machine sizing equation below:

$$P_{out} = \frac{\sqrt{2}}{2}\pi^3 K_{av} K_t K_{curve} \eta \left(\frac{f_e}{p_s}\right) B_{g,pk} A_{s,rms} D_{is}^2 L_e, \quad (1)$$

where $K_{av}$ is a coefficient to scale peak flux density to average flux density, $K_t$ is a stator tooth ratio number, $K_{curve}$ is a curve factor, $\eta$ is an efficiency value, $B_{g,pk}$ is a peak airgap flux density, $A_{s,rms}$, is an electric loading measured based on a root mean square (rms) current, $D_{is}$ is an inner diameter of stator 102, and $L_e$ is an effective length of electric machine 100. A preliminary geometry of electric machine 100 may be determined by choosing appropriate values of the key parameters, such as a diameter and a length of electric machine 100, $A_{s,rms}$, and $B_{g,pk}$, once a power and a speed rating are provided for electric machine 100. $B_{g,pk}$ may be limited by the saturation of steel, and $A_{s,rms}$ may be limited by the cooling of electric machine 100.

Figure 6:
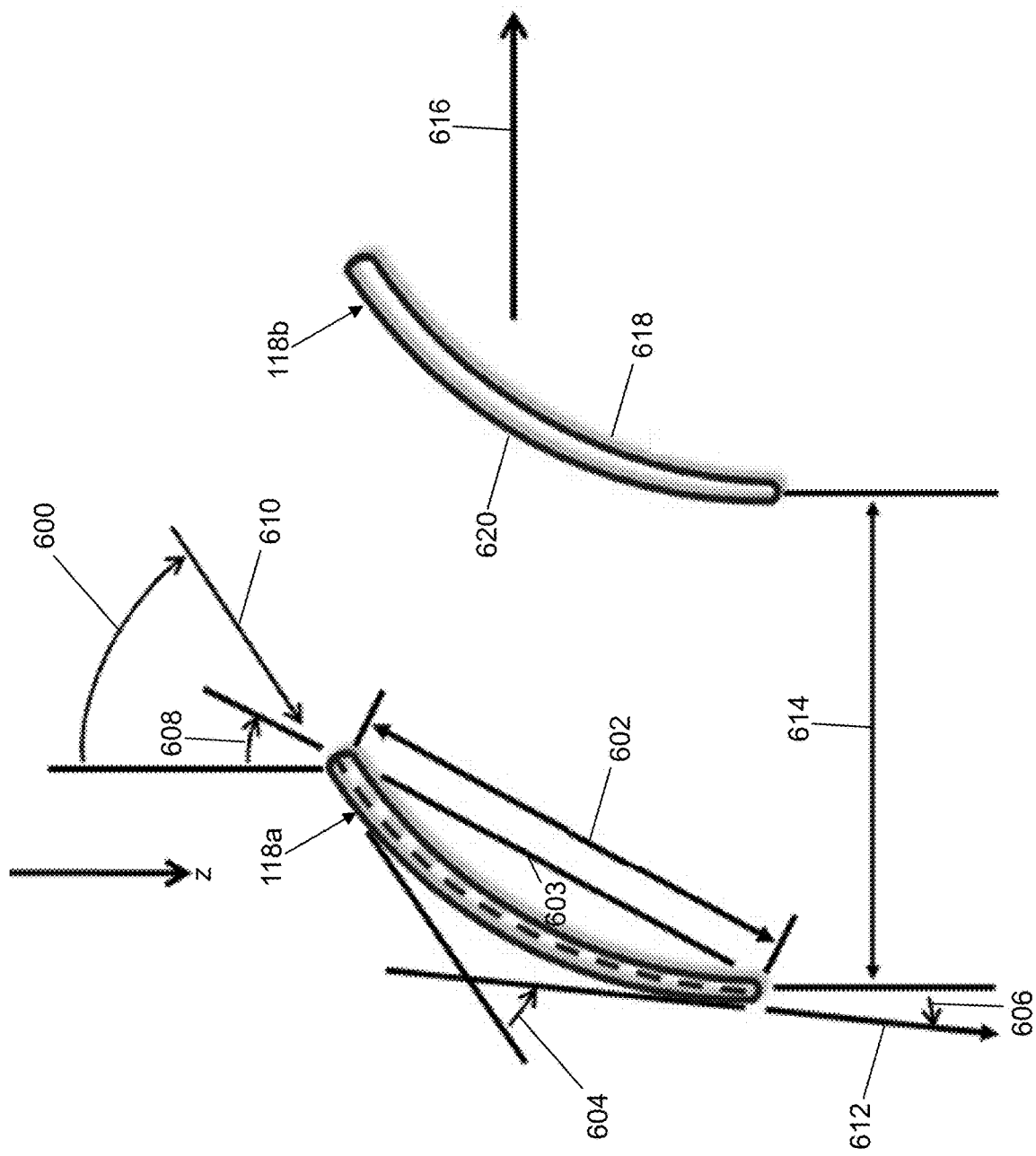
FIG. 6 depicts a rotor blade shape and nomenclature for a rotor of the electric machine of FIG. 1 in accordance with an illustrative embodiment.

The plurality of blades 118 are shaped with a specific curvature with a specific input (angle of attack) and output angle. Referring to FIG. 6, a rotor blade shape (curvature) and nomenclature is shown for rotor 104 or second rotor 104a of electric machine 100 in accordance with an illustrative embodiment. For illustration, first blade 118a or first airfoil blade 118a' of the plurality of blades 118 is curved with an inlet attacking angle 600, a chord length 602 of a chord line 603, a turn angle 604, an outlet attacking angle 606, and a stagger angle 608. Stagger angle 608 is an angle between chord line 603 and the z-axis (axial direction). Turn angle 604 of first blade 118a or first airfoil blade 118a' redirects an inlet flow velocity vector 610 to an outlet flow velocity vector 612. Inlet flow velocity vector 610 is an inlet flow velocity of the gas with respect to first blade 118a or first airfoil blade 118a'. Outlet flow velocity vector 612 is an outlet flow velocity of the gas with respect to first blade 118a or first airfoil blade 118a'. A blade pitch 614 is a distance between a center of successive blades of the plurality of blades 118. A rotation direction 616 defines a direction of rotation of the plurality of blades 118 resulting in a pressure side 618 and a suction side 620 for each blade of the plurality of blades 118.

Figure 7:
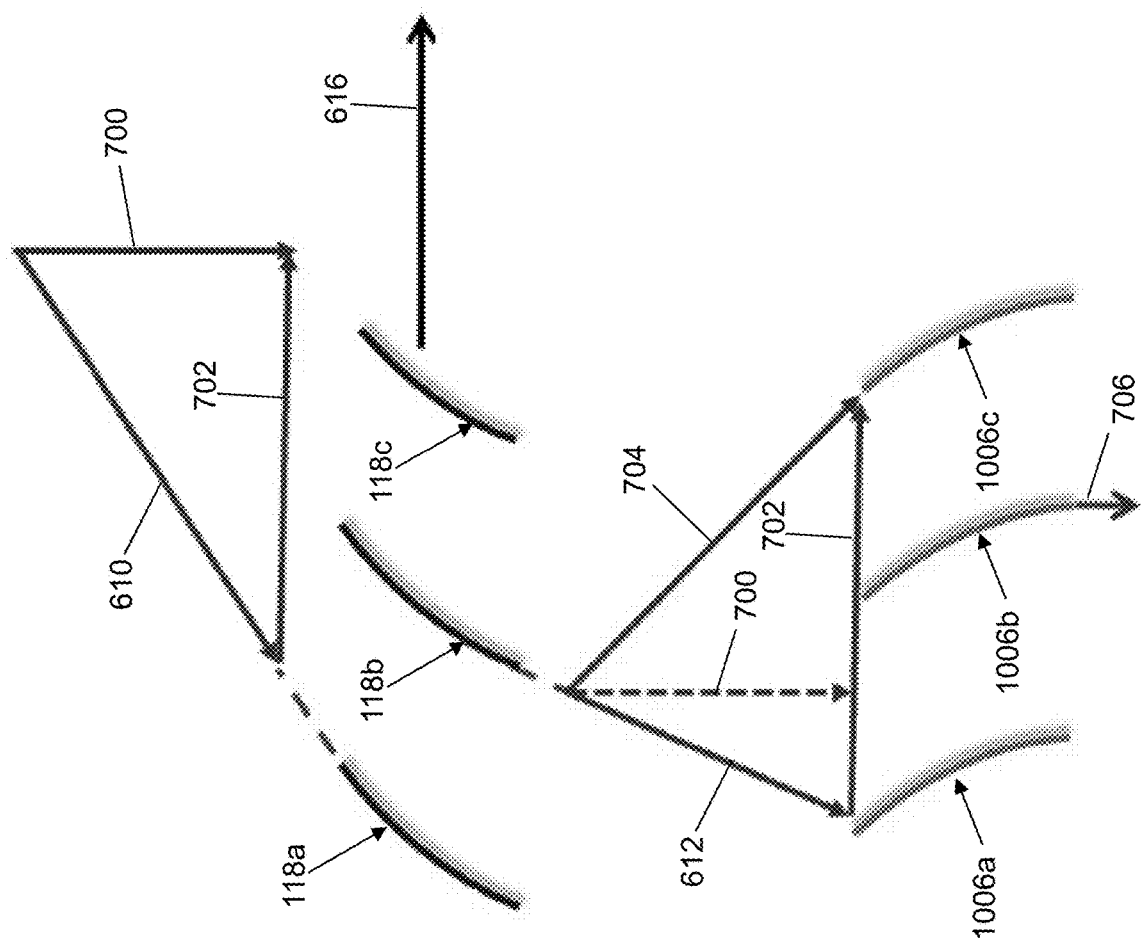
FIG. 7 depicts a velocity diagram of a flow through a rotor of the electric machine of FIG. 1 in accordance with an illustrative embodiment.

Referring to FIG. 7, a velocity diagram of a gas flow through rotor 104 or second rotor 104a of electric machine 100 is shown in accordance with an illustrative embodiment. A gas flow velocity vector 700 flowing into first blade 118a or first airfoil blade 118a' is assumed to have only an axial component. A blade speed vector 702 defines a blade speed at a middle blade diameter of each blade of the plurality of blades 118. A gas flow outlet velocity vector 704 is an actual velocity of the gas exiting rotor 104 or second rotor 104a. It may be assumed that gas flow velocity vector 700 remains constant. The torque, $T_{shaft}$, required in shaft 106 to compress the gas is proportional to a difference between tangential blade velocity and mass flow rate as shown below $$T_{shaft} = r(V_{1.5} - V_1)\frac{dm}{dt} \quad (2)$$

where m is the mass flow rate, r is a mean radius of first blade 118a or first airfoil blade 118a', and $V_1$ is gas flow velocity vector 700, which is the tangential velocity of the mean blade for the rotor inlet, and $V_{1.5}$ is gas flow outlet velocity vector 704, which is the tangential velocity of the mean blade for the rotor outlet.

Figure 8:
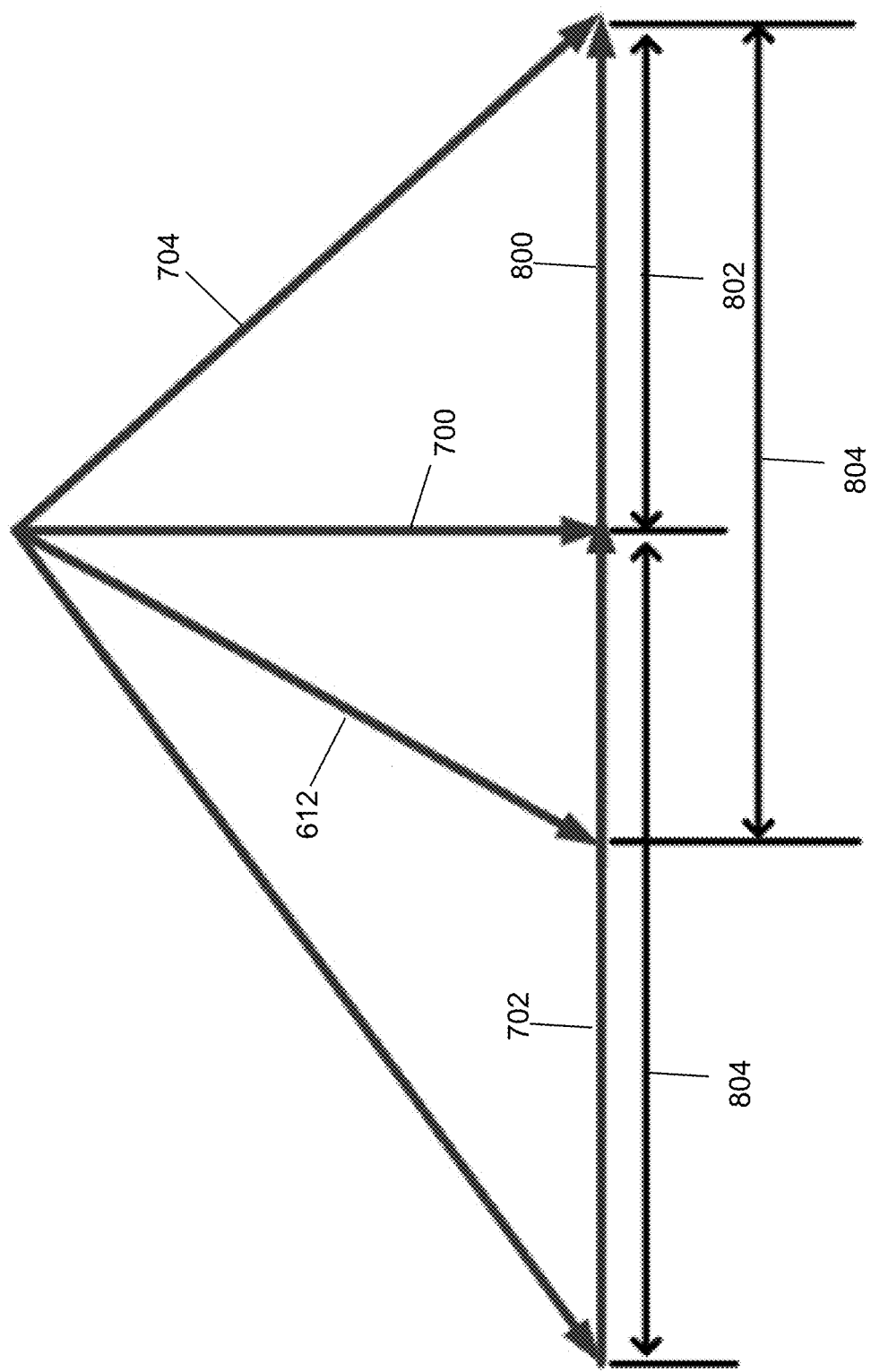
FIG. 8 depicts a combined velocity triangle for a rotor of the electric machine of FIG. 1 showing a velocity increase in accordance with an illustrative embodiment.

Referring to FIG. 8, a combined velocity triangle showing a velocity increase is shown for rotor 104 or second rotor 104a of electric machine 100 in accordance with an illustrative embodiment. A delta vector 800 completes the velocity triangle between gas flow velocity vector 700 and gas flow outlet velocity vector 704. A magnitude 802 of delta vector 800 indicates a net increase of rotor tangential velocity provided by first blade 118a or first airfoil blade 118a'. Blade speed vector 702 has a blade speed magnitude 804. The outlet gas also has a higher stagnation temperature as compared to an inlet stagnation temperature.

Figure 9:
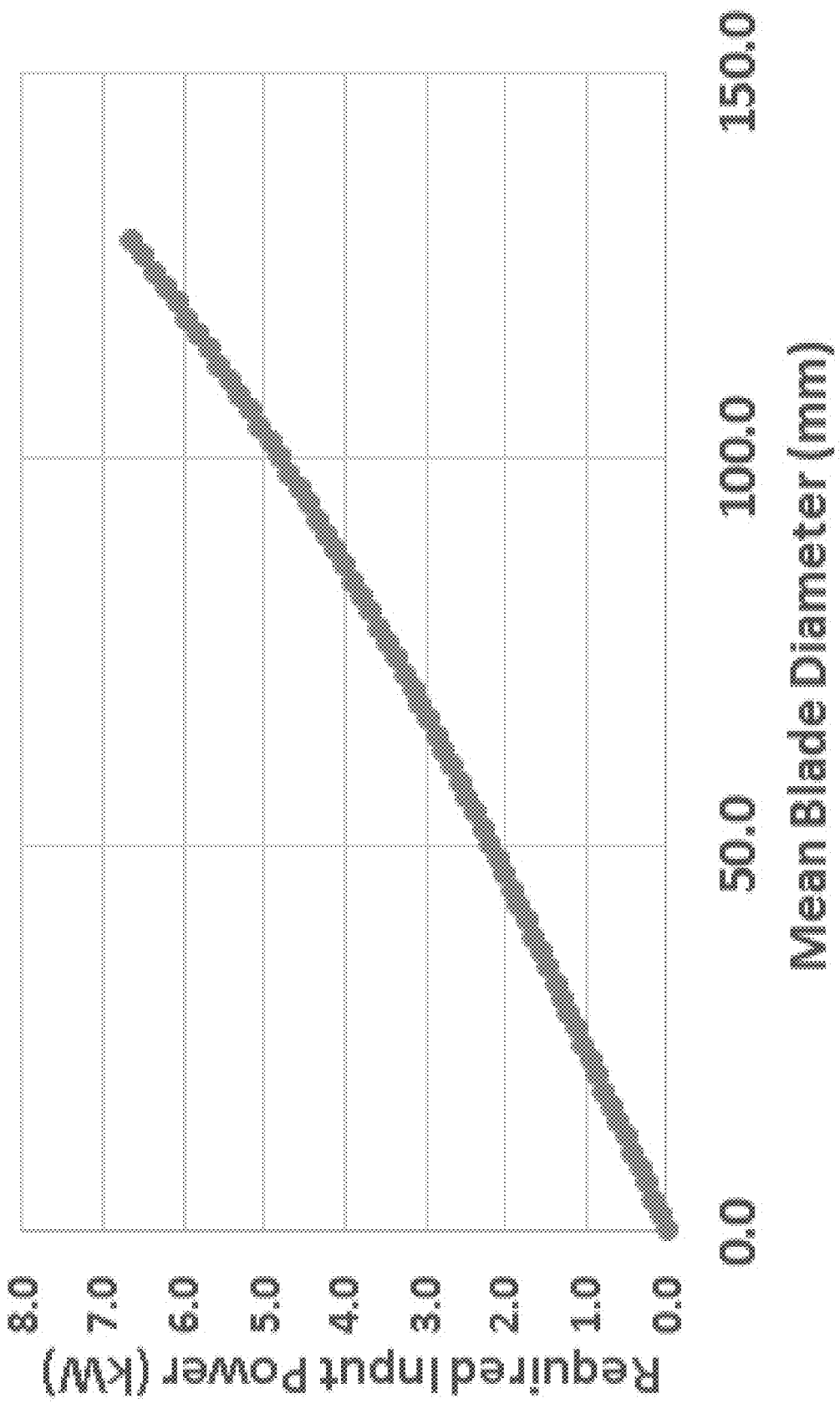
FIG. 9 depicts a required power for rotor compression work as a function of mean blade diameter for a rotor blade of a rotor of the electric machine of FIG. 1 in accordance with an illustrative embodiment.

Referring to FIG. 9, a required power for rotor compression work is shown as a function of mean blade diameter for first blade 118a or first airfoil blade 118a' in accordance with an illustrative embodiment.

Figure 10:
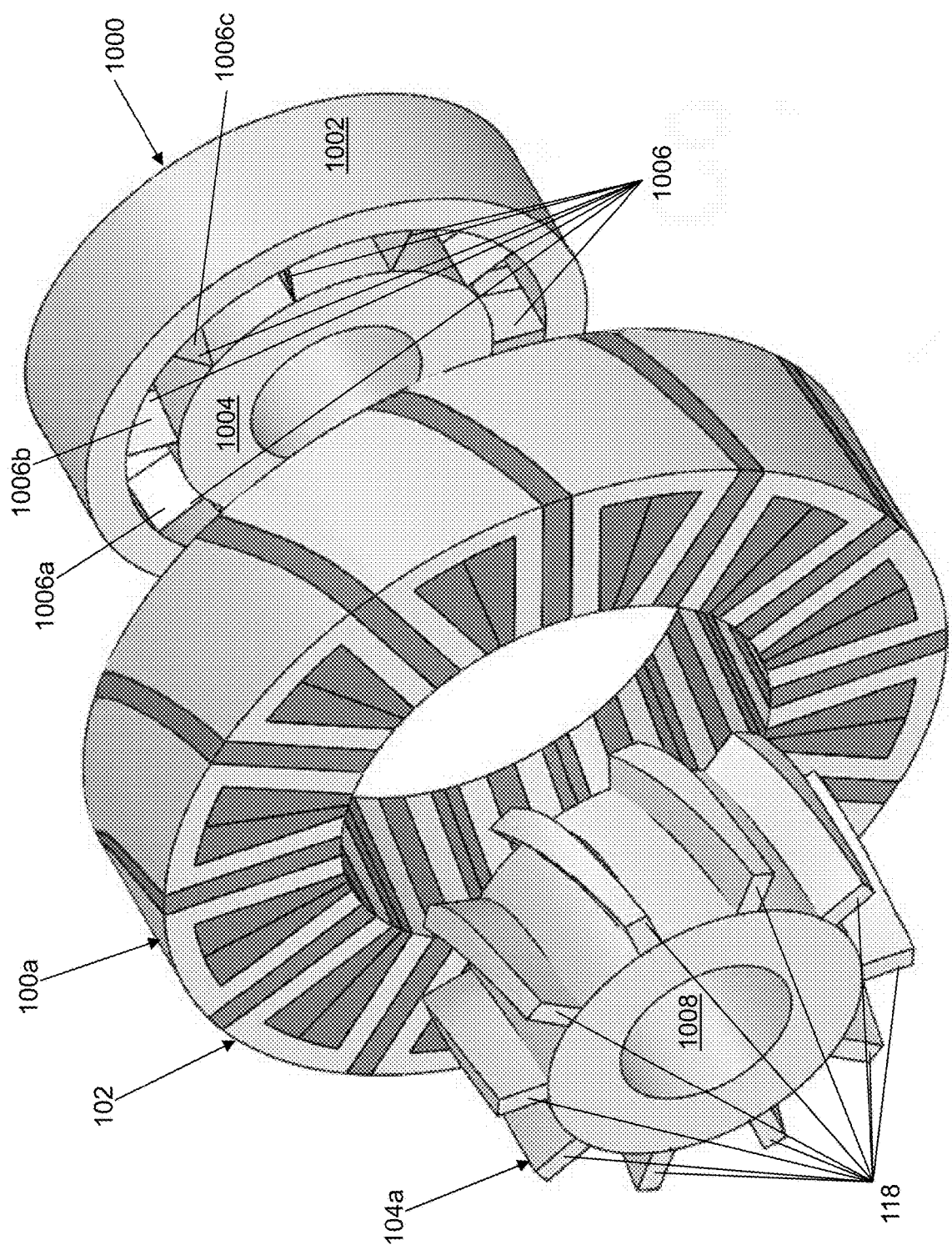
FIG. 10 depicts an exploded perspective view of an electric machine in accordance with a second illustrative embodiment.

Referring to FIG. 10, an exploded perspective view of a second electric machine 100a is shown in accordance with an illustrative embodiment. Second electric machine 100a includes stator 102 and second rotor 104a. A diffuser 1000 is mounted to second electric machine 100a to receive the gas compressed by the plurality of blades 118. Diffuser 1000 is a stationary diffuser that reduces the speed of the gas and increases the pressure on the gas to further compress the gas.

Diffuser 1000 may include an outer core 1002, an inner core 1004, and a plurality of diffuser blades 1006. For example, diffuser 1000 may include a first stator blade 1006a, a second stator blade 1006b, a third stator blade 1006c, etc. The plurality of diffuser blades 1006 are mounted between outer core 1002 and inner core 1004 to receive the gas output from second rotor 104a (or rotor 104), to reduces the speed of the gas, to further increase the pressure on the gas, and to output the further compressed gas. The gas from the output of the diffuser can be guided to another stage of compression such as another axial or centrifugal compressor.

Referring again to FIG. 8, the kinetic energy of the gas is converted into static pressure in diffuser 1000 where an outlet velocity 706 of the gas from diffuser 1000 is slowed down while the pressure is increased. To evaluate how much the pressure is increased by second rotor 104a and diffuser 1000, a pressure ratio is calculated as $$\frac{p_{o1.5}}{p_{o1}} = \left(\frac{T_{o1.5}}{T_{o1}}\right)^{k/(k-1)} \quad (3)$$

where $p_{o1.5}$ is a total diffuser outlet pressure, $p_{o1}$ is a total rotor inlet pressure, $T_{o1}$ is a total rotor inlet temperature of the gas, $T_{o1.5}$ is a total diffuser outlet temperature of the gas, and k is a ratio of specific heat. The two temperatures can be calculated as $$T_{o1} = T_1 + \frac{V_1^2}{2c_p} \quad (4)$$

$$T_{o1.5} = T_{o2} = T_{o1} - \frac{1w_2}{2c_p} \quad (5)$$

where $c_p$ is a constant pressure specific heat of the gas, $T_1$ is an inlet gas temperature, $1w_2$ is a work per unit mass done by rotor 104 and diffuser 1000 from an inlet to second rotor 104a to an outlet from diffuser 1000.

Figure 11:
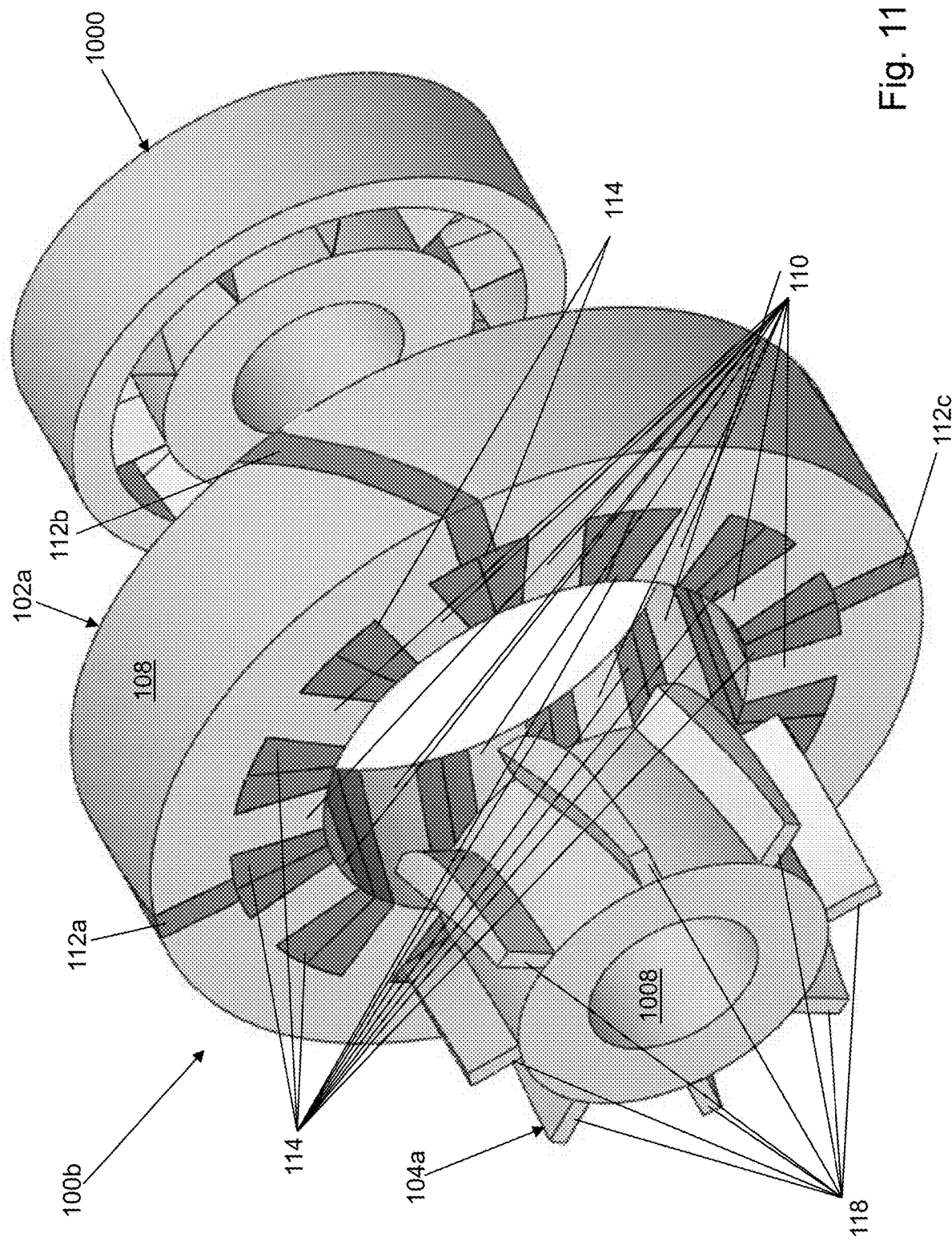
FIG. 11 depicts an exploded perspective view of the electric machine in accordance with a third illustrative embodiment.

Referring to FIG. 11, an exploded perspective view of a third electric machine 100b is shown in accordance with an illustrative embodiment. In the illustrative embodiment of FIG. 11, third electric machine 100b is a doubly salient permanent magnet machine. Third electric machine 100b may include a second stator 102a, second rotor 104a (or rotor 104), and the plurality of windings 114. In the illustrative embodiment, third electric machine 100b is a three-phase machine that can be configured as a generator or as a motor as understood by a person of skill in the art. Diffuser 1000 is mounted to third electric machine 100b to receive the gas compressed by the plurality of blades 118.

Second stator 102a may include stator core 108, the plurality of teeth 110, and the plurality of magnets 112 that form a plurality of stator poles. Second stator 102a has a generally circular cross section with a hollow core sized to accommodate shaft 106 and second rotor 104a (or rotor 104). The plurality of teeth 110 may have a different size and shape and number as compared to stator 102 as understood by a person of skill in the art. Unlike the plurality of magnets 112 of stator 102, the plurality of magnets 112 of second stator 102a are mounted to extend in a radial direction through stator core 108 in axial alignment with a slot of the plurality of slots instead of through the plurality of teeth 110. There also may be fewer or a greater number of magnets for the plurality of magnets 112 of second stator 102a. The plurality of windings 114 further may be wound through the plurality of slots of second stator 102a in a different manner than the plurality of windings 114 are wound through the plurality of slots of stator 102 as understood by a person of skill in the art.

Figure 12:
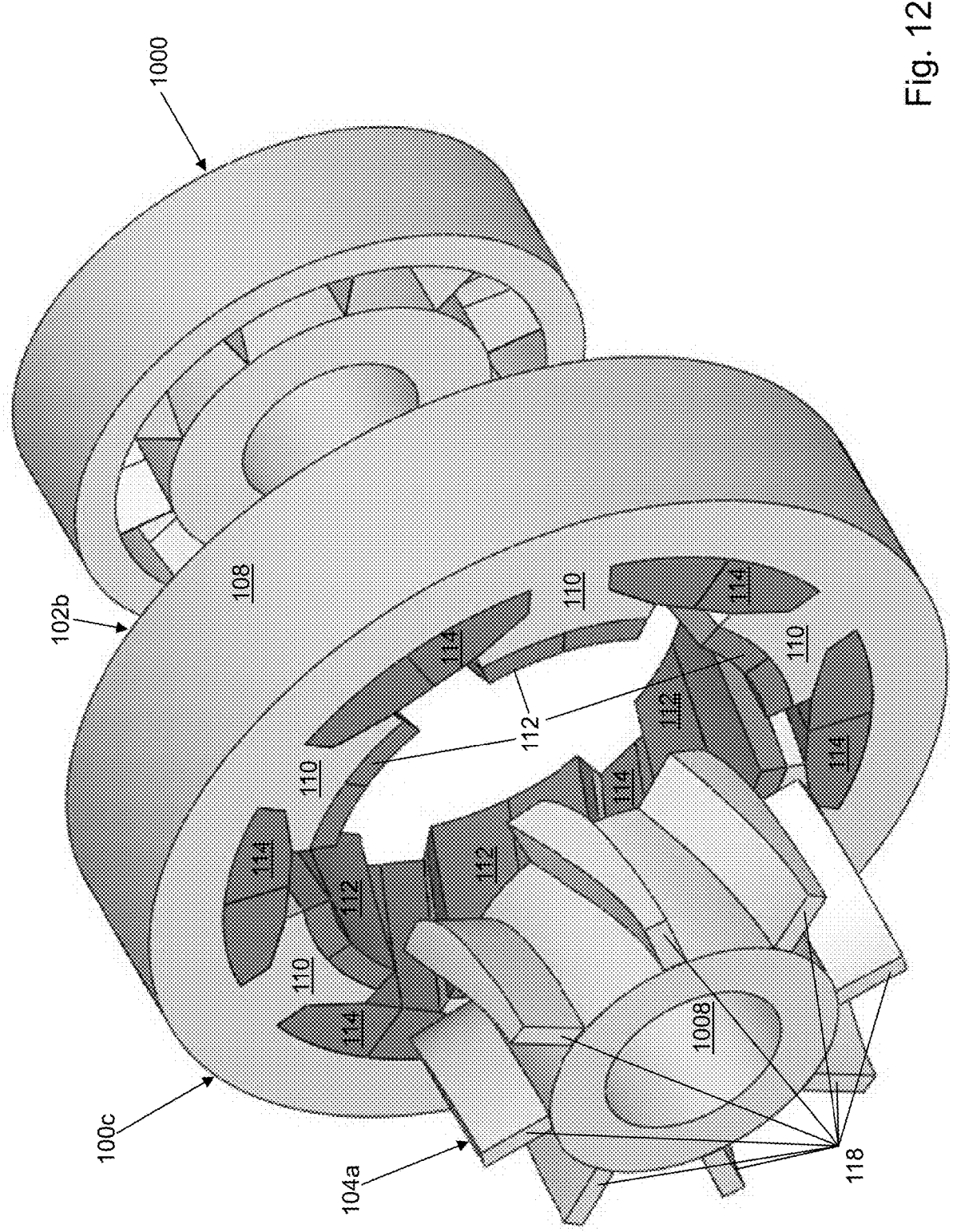
FIG. 12 depicts an exploded perspective view of the electric machine in accordance with a fourth illustrative embodiment.

Referring to FIG. 12, an exploded perspective view of a fourth electric machine 100c is shown in accordance with an illustrative embodiment. In the illustrative embodiment of FIG. 12, fourth electric machine 100c is a flux reversal permanent magnet machine. Fourth electric machine 100c may include a third stator 102b, second rotor 104a (or rotor 104), and the plurality of windings 114. In the illustrative embodiment, fourth electric machine 100c is a three-phase machine that can be configured as a generator or as a motor as understood by a person of skill in the art. Diffuser 1000 is mounted to fourth electric machine 100c to receive the gas compressed by the plurality of blades 118.

Third stator 102b may include stator core 108, the plurality of teeth 110, and the plurality of magnets 112 that form a plurality of stator poles. Third stator 102b has a generally circular cross section with a hollow core sized to accommodate shaft 106 and second rotor 104a (or rotor 104). The plurality of teeth 110 may have a different size and shape and number as compared to stator 102 as understood by a person of skill in the art. Unlike the plurality of magnets 112 of stator 102, the plurality of magnets 112 of second stator 102a are mounted to an exterior face of each tooth of the plurality of teeth 110 instead of through the plurality of teeth 110. The exterior face of each tooth of the plurality of teeth 110 faces second rotor 104a (or rotor 104). Air gap 120 separates the plurality of blades 118 from each magnet of the plurality of magnets 112. There also may be fewer or a greater number of magnets for the plurality of magnets 112 of third stator 102b. The plurality of windings 114 further may be wound through the plurality of slots of third stator 102b in a different manner than the plurality of windings 114 are wound through the plurality of slots of stator 102 as understood by a person of skill in the art.

Figure 13:
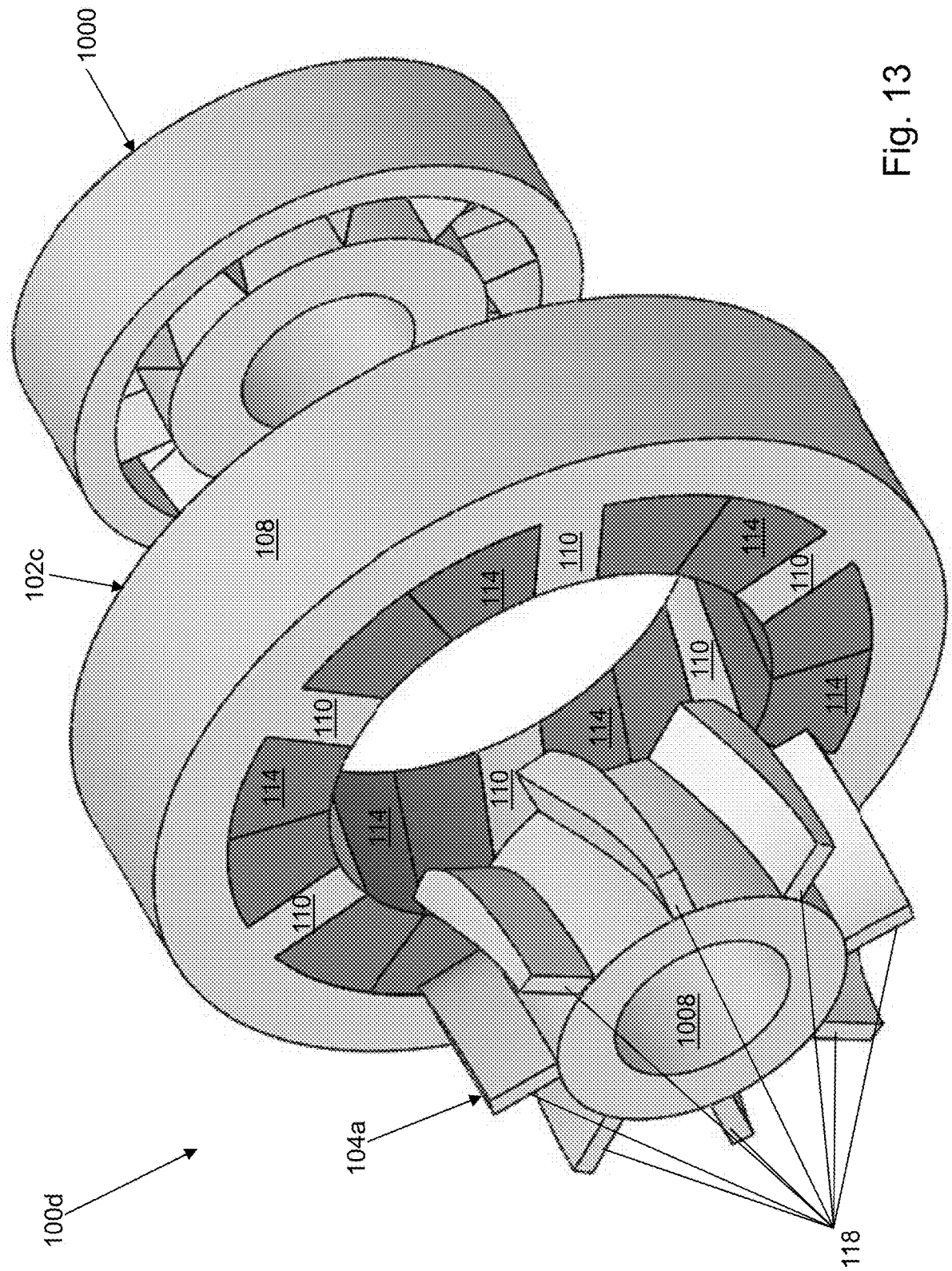
FIG. 13 depicts an exploded perspective view of the electric machine in accordance with a fifth illustrative embodiment.

Referring to FIG. 13, an exploded perspective view of a fifth electric machine 100d is shown in accordance with an illustrative embodiment. In the illustrative embodiment of FIG. 13, fifth electric machine 100d is a switched reluctance machine. Fifth electric machine 100d may include a fourth stator 102c, second rotor 104a (or rotor 104), and the plurality of windings 114. In the illustrative embodiment, fifth electric machine 100d is a three-phase machine that can be configured as a generator or as a motor as understood by a person of skill in the art. Diffuser 1000 is mounted to fifth electric machine 100c to receive the gas compressed by the plurality of blades 118.

Fourth stator 102c may include stator core 108 and the plurality of teeth 110 that form a plurality of stator poles. Fourth stator 102c has a generally circular cross section with a hollow core sized to accommodate shaft 106 and second rotor 104a (or rotor 104). The plurality of teeth 110 may have a different size and shape and number as compared to stator 102 as understood by a person of skill in the art. The plurality of windings 114 further may be wound through the plurality of slots of fourth stator 102c in a different manner than the plurality of windings 114 are wound through the plurality of slots of stator 102 as understood by a person of skill in the art.

Figure 14:
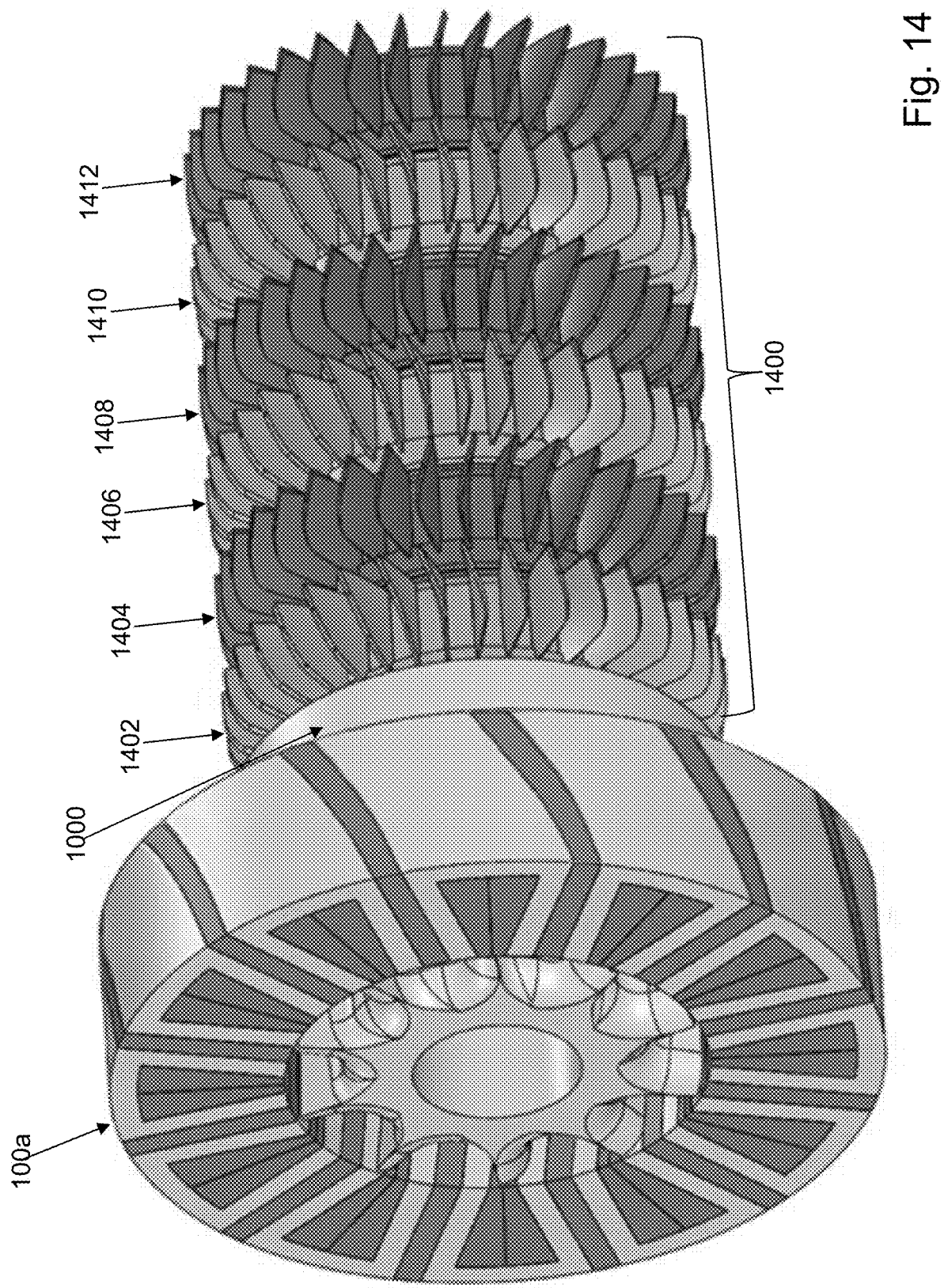
FIG. 14 depicts a perspective view of the electric machine of FIG. 10 with a cascaded connection of multi-stage compressors in accordance with an illustrative embodiment.

Referring to FIG. 14, a perspective view of second electric machine 100a and diffuser 1000 is shown with a connection to a multi-stage compressor 1400 in accordance with an illustrative embodiment. Diffuser 1000 may not be included in an alternative embodiment. Multi-stage compressor 1400 is mounted to receive compressed gas from diffuser 1000. Arrays of airfoils of multi-stage compressor 1400 may be set in rows, usually as pairs. For example, in each pair of compressors, one compressor of the pair may be rotating and the other compressor of the pair may be stationary. In the illustrative embodiment of FIG. 14, multi-stage compressor 1400 includes a first rotating compressor 1402 paired with a first stationary compressor 1404, a second rotating compressor 1406 paired with a second stationary compressor 1408, and a third rotating compressor 1410 paired with a third stationary compressor 1412. Multi-stage compressor 1400 may include a fewer or a greater number of arrays of airfoils.

The rotating airfoils or rotor blades of first rotating compressor 1402, second rotating compressor 1406, and third rotating compressor 1410 accelerate the gas received from a previous stage such as diffuser 1000, first stationary compressor 1404, and second stationary compressor 1408, respectively. The stationary airfoils, also known as stators or vanes, of first stationary compressor 1404, second stationary compressor 1408, and third stationary compressor 1412 decelerate and redirect the flow direction of the gas, preparing it for the rotor blades of the next stage such as second rotating compressor 1406 and third rotating compressor 1410. A cross-sectional area of a gas passage may diminish along multi-stage compressor 1400 to maintain an optimum axial Mach number. Beyond about five stages or a 4:1 design pressure ratio, a variable geometry may be used to further improve a compression of the gas.

The design for multi-stage compressor 1400 follows the same rules as outlined above for rotor 104 and second rotor 104*a* such that if the mean blade diameter stays constant, the power required for each successive stage is the same as the first stage assuming turn angle 604 and inlet flow velocity vector 610 remain the same. The pressure rise ratio normally decreases slightly for the later stages while the temperature increases from stage to stage. If the blade mean diameter is allowed to change, the required power at each stage is calculated as:

$$P_{stage} = \frac{dm}{dt} r\omega \left[ r\omega - V_1 \tan\left( \arctan\left( \frac{d\omega}{2V_1} \right) - \theta \right) \right] \quad (6)$$

where $\theta$ is turn angle 604, and $\omega$ is an angular speed of rotor 104. The required power at a second stage as a function of rotor mean blade diameter is shown in FIG. 9.

Figure 15:
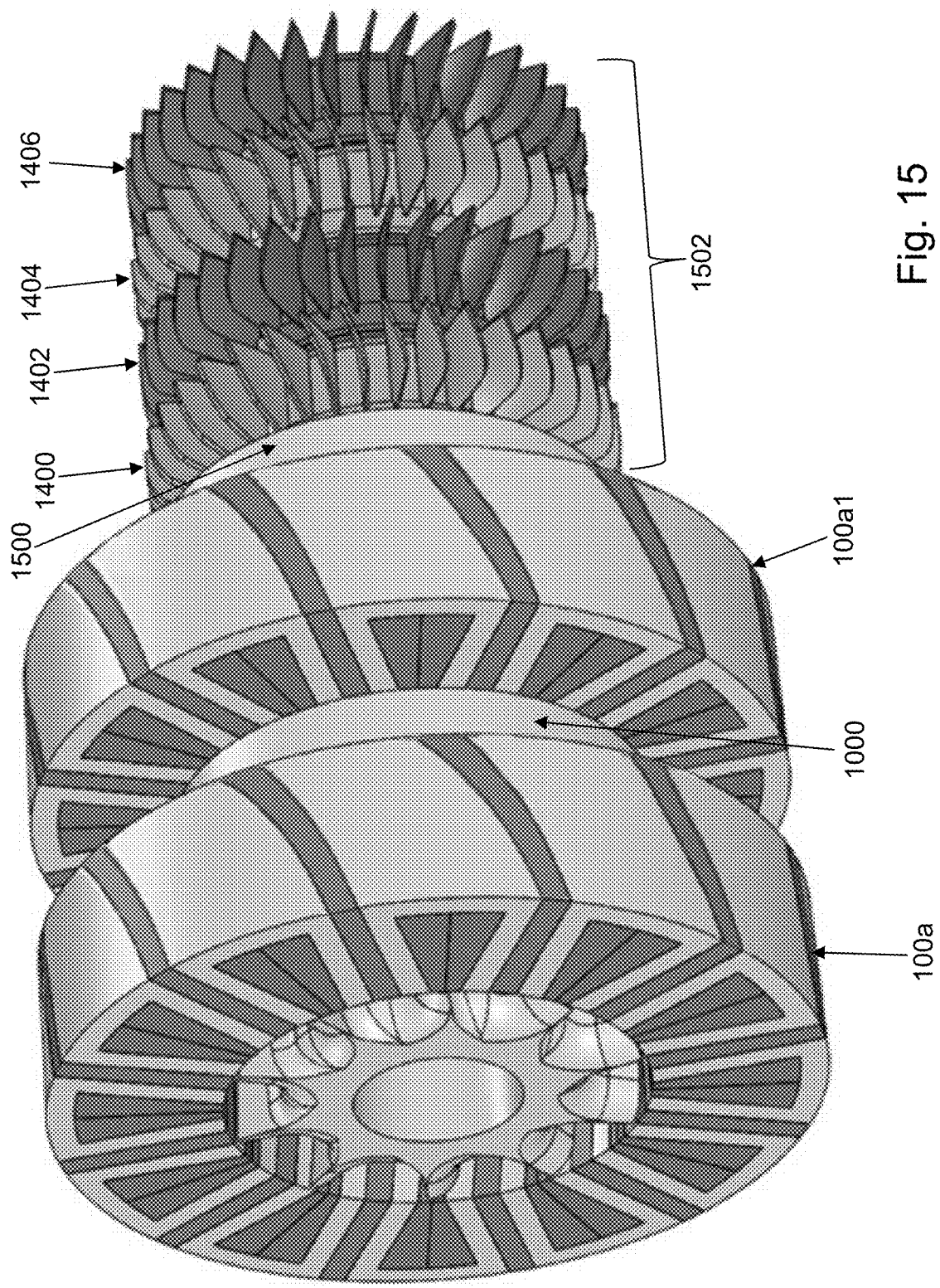
FIG. 15 depicts a perspective view of a cascaded connection of two electric machines of FIG. 10 with a cascaded connection of multi-stage compressors in accordance with an illustrative embodiment.

Referring to FIG. 15, a perspective view of second electric machine 100*a*, diffuser 1000, a second instance 100*a*1 of second electric machine 100*a*, and a second diffuser 1500 is shown with a connection to a second multi-stage compressor 1502 in accordance with an illustrative embodiment. Diffuser 1000 is mounted to receive compressed gas from second electric machine 100*a*. Second instance 100*a*1 of second electric machine 100*a* is mounted to receive compressed gas from diffuser 1000. Second diffuser 1500 is mounted to receive compressed gas from second instance 100*a*1 of second electric machine 100*a*. Second multi-stage compressor 1502 is mounted to receive compressed gas from second diffuser 1500. In the illustrative embodiment of FIG. 15, second multi-stage compressor 1502 includes first rotating compressor 1402 paired with first stationary compressor 1404 and second rotating compressor 1406 paired with a second stationary compressor 1408. Second multi-stage compressor 1502 may include a fewer or a greater number of arrays of airfoils. Diffuser 1000 and/or second diffuser 1500 may not be included in alternative embodiments. A greater number of electric machines 100 of the same or different type may be included in alternative embodiments.

Figure 16:
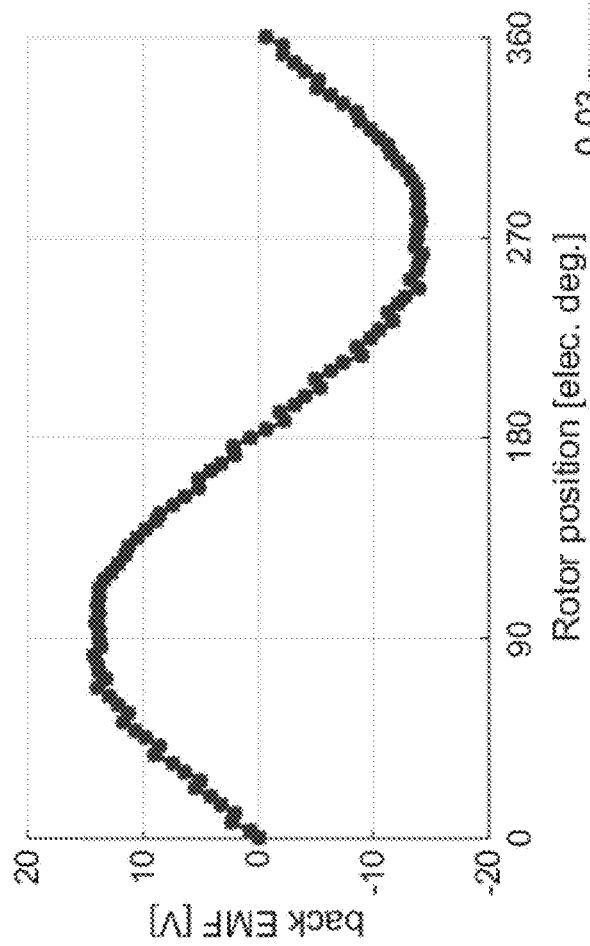
FIG. 16 depicts a back-electromotive force generated by the electric machine of FIG. 1 as a function of the rotor position in accordance with an illustrative embodiment.
Figure 17:
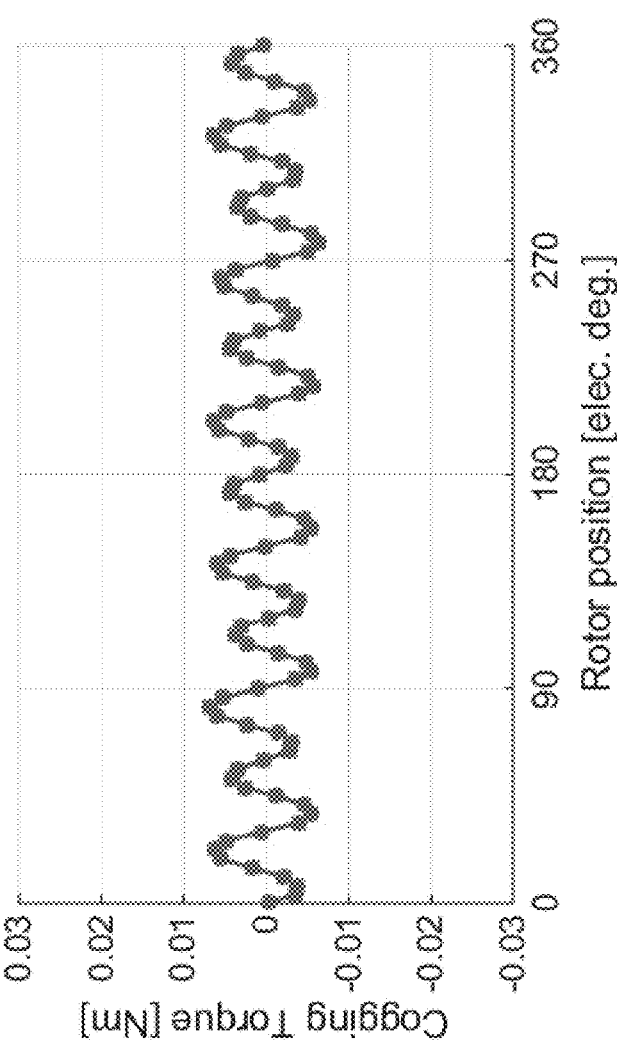
FIG. 17 depicts a cogging torque generated by the electric machine of FIG. 1 as a function of a rotor position in accordance with an illustrative embodiment.
Figure 18:
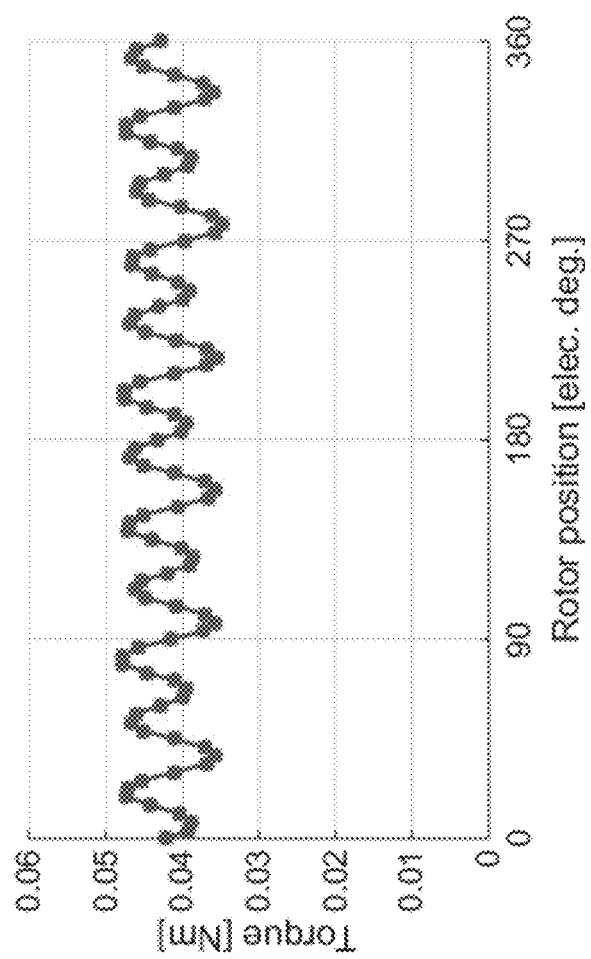
FIG. 18 depicts a torque generated by the electric machine of FIG. 1 as a function of the rotor position in accordance with an illustrative embodiment.

The various dimensions of the elements of the electric machines described herein may be determined based on desired rated performance characteristics using analytical sizing equations and finite element analysis using an electromechanical design tool. For example, referring to FIG. 16, a cogging torque generated by electric machine 100 is shown in accordance with an illustrative embodiment. Referring to FIG. 17, a back-electromotive force (back-EMF) generated by electric machine 100 as a function of a rotor position is shown in accordance with an illustrative embodiment. Referring to FIG. 18, a torque generated by electric machine 100 as a function of the rotor position is shown in accordance with an illustrative embodiment. The cogging torque, the back-EMF, and the torque were determined using finite element analysis and the parameter values listed in Table 1 below.

TABLE 1

| Parameters | Values |
| --- | --- |
| Electric machine power, $P_{out}$ [kW] | 40 |
| Rotor speed n [krpm] | 15 |
| Hub diameter $D_{hub}$ [mm] | 103.2 |
| Blade tip diameter $D_{tip}$ [mm] | 136.4 |
| Stator curve slot pitch | 1 |
| Blade turn angle, $\theta$ [deg.] | 30 |
| Axial air flux velocity, $V_1$ [m/s] | 170 |
| Specific gas constant, $R_{specific}$ [J/(kg*K)] | 287.1 |
| Air pressure $p_{o1}$ [kPa] | 101.3 |
| Air temperature, $T_1$ [K] | 300 |
| Mass rate of flow, m [kg/s] | 1.249 |
| Torque required, T [Nm] | 7.524 |
| Power required, P [kW] | 11.82 |
| Inlet stagnation temperature, $T_{o1}$ [K] | 314.4 |
| Rotor outlet stagnation temperature, $T_{o1.5}$ [K] | 323.8 |
| Ideal pressure rise | 10.88% |

Hub diameter $D_{hub}$ is a diameter 500 (shown referring to FIG. 5) of a yoke of rotor 104. Blade tip diameter $D_{tip}$ is an outer diameter 502 (shown referring to FIG. 5) of rotor 104. Axial air flux velocity $V_1$ is a magnitude of gas flow velocity vector 700 at an input to diffuser 1000. Air pressure $p_{o1}$ is a pressure at an inlet of diffuser 1000. Air temperature $T_1$ is an input air temperature. Torque required, T, and power required, P, is a torque and a power required to compress the gas. Ideal pressure rise is a percentage pressure increase at an output with respect to an inlet pressure. The airflow compression rise of rotor 104 was calculated as 10.88%, which is in a typical range of 5% to 20% for a single stage compression using subsonic tip speed blades. The power required to compress the air is calculated to be 11.82 kW, so the remaining power supplied by the electric machine can be used for additional rotating compressor stages. The proposed machine has a sinusoidal back-EMF and a small cogging torque, which is beneficial to improving efficiency.

To further refine the parameters of the electric machines describe herein including a determination of an optimum curve angle for stator 102 and rotor 104 as well as the airfoil shape of the plurality of blades to achieve maximum pressure ratios without sacrificing the electromagnetic performance, multi-physics simulations that integrate the analysis of electromagnetic, thermal, and fluid dynamic aspects are performed for various operating stages using advanced co-simulation and analysis tools.

A flowchart for the multi-physics design is provided in FIG. 19. In an operation, input parameters are defined. For example, in an operation 1900, initial dimensions of electric machine 100 design requirements are defined for electric machine 100 in terms of axial air flow, electromagnetic torque, structure, and thermal properties.

In an operation 1902, a computational fluid dynamics simulation of the defined electric machine 100 is executed to determine axial air flow. In an operation 1904, the determined axial air flow is verified against the design requirements. At this stage, fluid dynamic properties of the designed machine are validated.

In an operation 1906, a finite element analysis simulation of the defined electric machine 100 is executed to determine a torque production. In an operation 1908, the determined torque production is verified against the design requirements. At this stage, the electromagnetic properties of the designed machine are validated.

In an operation 1910, a determination is made concerning both fluid dynamics and electromagnetics to validate whether or not the determined axial air flow, compression ratio, and the determined torque production satisfy the design requirements. If the determined axial air flow, compression ratio, and the determined torque production satisfy the design requirements, processing continues in an operation 1914. If the determined axial air flow, compression ratio, and the determined torque production do not satisfy the design requirements, processing continues in an operation 1912.

In operation 1912, dimensions of the plurality of blades 118 that form the plurality of rotor poles are modified, and processing continues in operation 1902 with the modified dimensions. The curvature along with input (angle of attack) angle and output angle of the plurality of blades 118 are modified. The plurality of stator poles are also modified to have the average trajectory of the rotor curvature.

In operation 1914, structural and thermal simulation of the defined electric machine 100 is executed to determine that the structure of the machine meets various mechanical requirements such as vibration, stress, and reliability. Similarly, thermal design of electric machine 100 should be such that the machine receives adequate cooling, and the materials used in the machine do not exceed its temperature rating.

In an operation 1916, a determination is made concerning whether or not the determined torque, air flow, compression, thermal, vibration, stress, and reliability measures satisfy the design requirements. If the determined measures satisfy the design requirements, processing continues in an operation 1918. If the determined measures do not satisfy the design requirements, processing continues in operation 1912.

In operation 1918, the design parameters for electric machine 100 that satisfy the design requirements are output, for example, to a computer-readable medium or a computer display.

In conventional compressors, a drive motor is mounted separately from a compressor assembly often with additional gears or outlet casing since the motor is mounted so that the axial flow of the gas is not compromised. The drive motor along with its independent cooling mechanism adds additional losses in addition to weight and volume. The electric machines described herein provide a reduced volume and utilize the pressure and temperature difference.

By incorporating electric machine 100, 100a, 100b, 100c, 100d at a low pressure stage of a compressor, a natural cooling mechanism is provided for electric machine 100, 100a, 100b, 100c, 100d keeping the internal temperature and losses at a minimum. Because axial-flow compression is particularly advantageous for higher pressure ratios, multiple stages of compression can be achieved by cascading electric machine 100, 100a, 100b, 100c, 100d with one or more diffuser 1000. To further increase a discharge pressure, an axial flow compressor can be combined with a radial flow stage at the axial stage outlet.

The term "air" is used herein to reference any gas. The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, in the detailed description, using "and" or "or" is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated. It is intended that the scope of the disclosed subject matter be defined by the claims appended hereto and their equivalents.

What is claimed is:

1. An electrical machine comprising:
   a rotor comprising
     a rotor core configured to mount to a shaft for rotation of the rotor core and shaft together; and
     a plurality of blades extending radially away from the rotor core, wherein each blade of the plurality of blades is curved axially along the rotor core with a first non-zero radius of curvature, wherein both radially extending sides of each blade of the plurality of blades is curved with a second non-zero radius of curvature, wherein a width between the radially extending sides of a respective blade in a direction perpendicular to a radial direction from a center of the rotor core decreases away from the rotor core;
   a stator comprising
     a stator core; and
     a plurality of teeth extending from the stator core toward the plurality of blades, wherein the plurality of teeth define a plurality of slots between successive teeth of the plurality of teeth; and
   a winding wound through at least two slots of the plurality of slots;
   wherein the stator is mounted radially relative to the rotor so that a gap separates the plurality of blades from an exterior face of the plurality of teeth;
   wherein the exterior face of the plurality of teeth is axially aligned along the stator core to follow an axial edge of a blade of the plurality of blades.

2. The electrical machine of claim 1, further comprising:
   a plurality of permanent magnets, wherein a permanent magnet of the plurality of permanent magnets is mounted to extend in a second radial direction through each tooth of the plurality of teeth;
   wherein the winding is wound over at least one permanent magnet of the plurality of permanent magnets and through at least two slots of the plurality of slots;
   wherein the plurality of permanent magnets are axially aligned to follow the axial edge of the blade of the plurality of blades.

3. The electrical machine of claim 1, further comprising:
   a plurality of permanent magnets, wherein a permanent magnet of the plurality of permanent magnets is mounted to extend in a second radial direction through the stator core in axial alignment with a slot of the plurality of slots.

4. The electrical machine of claim 1, further comprising:
   a plurality of permanent magnets, wherein a permanent magnet of the plurality of permanent magnets is mounted to the exterior face of each tooth of the plurality of teeth, wherein a second gap within the gap separates the plurality of blades from each permanent magnet of the plurality of permanent magnets.

5. The electrical machine of claim 1, further comprising:
a stationary diffuser mounted to extend axially from the rotor to receive a compressed gas from the rotor, wherein the stationary diffuser is configured to further compress the received, compressed gas.

6. The electrical machine of claim 5, further comprising:
a first rotating gas compressor mounted to extend axially from the stationary diffuser to receive the further compressed gas, wherein the first rotating gas compressor is configured to still further compress the received, further compressed gas.

7. The electrical machine of claim 6, further comprising:
a second stationary diffuser mounted to extend axially from the first rotating gas compressor to receive the still further compressed gas, wherein the second stationary diffuser is configured to reduce a velocity of the received, still further compressed gas.

8. The electrical machine of claim 1, further comprising:
a first rotating gas compressor mounted to extend axially from the rotor to receive a compressed gas from the rotor, wherein the first rotating gas compressor is configured to further compress the received, compressed gas.

9. The electrical machine of claim 8, further comprising:
a first stationary diffuser mounted to extend axially from the first rotating gas compressor to receive the further compressed gas, wherein the first stationary diffuser is configured to reduce a velocity of the received, further compressed gas.

10. The electrical machine of claim 8, wherein the first rotating gas compressor is mounted to the shaft.

11. The electrical machine of claim 1, further comprising:
a second rotor comprising
    a second rotor core configured to mount to the shaft for rotation of the second rotor core and shaft together; and
    a second plurality of blades extending radially away from the second rotor core, wherein each blade of the second plurality of blades is curved axially along the second rotor core with a third non-zero radius of curvature, wherein both radially extending sides of each blade of the second plurality of blades is curved with a fourth non-zero radius of curvature, wherein a second width between the radially extending sides of a respective blade of each blade of the second plurality of blades in a second direction perpendicular to a second radial direction from a second center of the second rotor core decreases away from the second rotor core;
a second stator comprising
    a second stator core; and
    a second plurality of teeth extending from the second stator core toward the second plurality of blades, wherein the second plurality of teeth define a second plurality of slots between successive teeth of the second plurality of teeth; and
a second winding wound through at least two slots of the second plurality of slots;
wherein the second stator is mounted radially relative to the second rotor so that a second gap separates the second plurality of blades from an exterior face of the second plurality of teeth;
wherein the exterior face of the second plurality of teeth is axially aligned along the second stator core to follow a second axial edge of a second blade of the second plurality of blades.

12. The electrical machine of claim 11, further comprising:
a plurality of permanent magnets, wherein a permanent magnet of the plurality of permanent magnets is mounted to extend in a second radial direction through each tooth of the plurality of teeth; and
a second plurality of permanent magnets, wherein a permanent magnet of the second plurality of permanent magnets is mounted to extend in a third radial direction through each tooth of the second plurality of teeth;
wherein the winding is wound over at least one permanent magnet of the plurality of permanent magnets and through at least two slots of the plurality of slots;
wherein the second winding is wound over at least one permanent magnet of the second plurality of permanent magnets and through at least two slots of the second plurality of slots;
wherein the plurality of permanent magnets are axially aligned to follow the axial edge of the blade of the plurality of blades,
wherein the second plurality of permanent magnets are axially aligned to follow the axial edge of the second blade of the second plurality of blades.

13. The electrical machine of claim 11, further comprising:
a plurality of permanent magnets, wherein a permanent magnet of the plurality of permanent magnets is mounted to extend in a second radial direction through the stator core in axial alignment with a slot of the plurality of slots; and
a second plurality of permanent magnets, wherein a permanent magnet of the second plurality of permanent magnets is mounted to extend in a third radial direction through the second stator core in axial alignment with a slot of the second plurality of slots.

14. The electrical machine of claim 11, further comprising:
a plurality of permanent magnets, wherein a permanent magnet of the plurality of permanent magnets is mounted to the exterior face of each tooth of the plurality of teeth, wherein a third gap within the gap separates the plurality of blades from each permanent magnet of the plurality of permanent magnets; and
a second plurality of permanent magnets, wherein a permanent magnet of the second plurality of permanent magnets is mounted to the exterior face of each tooth of the second plurality of teeth, wherein a fourth gap within the second gap separates the second plurality of blades from each permanent magnet of the second plurality of permanent magnets.

15. The electrical machine of claim 11, further comprising:
a stationary diffuser mounted to extend axially from the rotor to receive a compressed gas from the rotor, wherein the stationary diffuser is configured to further compress the compressed gas received from the rotor.

16. The electrical machine of claim 15, wherein the stationary diffuser is mounted between the rotor and the second rotor, and the second gas is output from the stationary diffuser.

17. The electrical machine of claim 16, further comprising:

a second stationary diffuser mounted to extend axially from the second rotor to receive a compressed second gas from the second rotor, wherein the second stationary diffuser is configured to further compress the compressed second gas received from the second rotor.

18. The electrical machine of claim 17, further comprising:
a first rotating gas compressor mounted to extend axially from the second stationary diffuser to receive the further compressed second gas, wherein the first rotating gas compressor is configured to still further compress the received, further compressed second gas.

19. The electrical machine of claim 18, further comprising:
a third stationary diffuser mounted to extend axially from the first rotating gas compressor to receive the still further compressed second gas, wherein the third stationary diffuser is configured to reduce a velocity of the received, still further compressed second gas.

20. The electrical machine of claim 18, wherein the first rotating gas compressor is mounted to the shaft.

* * * * *

UNITED STATES PATENT AND TRADEMARK OFFICE
CERTIFICATE OF CORRECTION

PATENT NO. : 10,539,147 B2
APPLICATION NO. : 14/994313
DATED : January 21, 2020
INVENTOR(S) : Bulent Sarlioglu et al.

Page 1 of 1

It is certified that error appears in the above-identified patent and that said Letters Patent is hereby corrected as shown below:

In the Specification

Column 6, Lines 66-67:
Delete the phrase "sixth airfoil blade 118f," and replace with --sixth airfoil blade 118f',--.

Column 7, Line 7:
Delete the phrase "tenth airfoil blade 118F" and replace with --tenth airfoil blade 118j'--.

Column 11, Lines 28-29:
Delete the phrase "and co is an angular speed of rotor 104" and replace with --and $\omega$ is an angular speed of rotor 104--.

Signed and Sealed this
Thirty-first Day of March, 2020

Andrei Iancu
*Director of the United States Patent and Trademark Office*